(12) United States Patent
Schloemer

(10) Patent No.: US 11,082,909 B2
(45) Date of Patent: *Aug. 3, 2021

(54) RADIO SYSTEM USING NODES WITH HIGH GAIN ANTENNAS

(71) Applicant: Star Mesh LLC, Princeton Junction, NJ (US)

(72) Inventor: Gerald R. Schloemer, Round Lake, IL (US)

(73) Assignee: Star Mesh LLC, Princeton Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,292

(22) Filed: Aug. 22, 2020

(65) Prior Publication Data

US 2020/0396670 A1 Dec. 17, 2020

Related U.S. Application Data

(60) Continuation of application No. 16/110,538, filed on Aug. 23, 2018, now Pat. No. 10,791,493, which is a
(Continued)

(51) Int. Cl.
*H04W 16/28* (2009.01)
*H01Q 15/14* (2006.01)
(Continued)

(52) U.S. Cl.
CPC ........ *H04W 40/12* (2013.01); *H04B 7/18515* (2013.01); *H04B 7/18519* (2013.01);
(Continued)

(58) Field of Classification Search
CPC .... H04B 7/185; H04B 7/1851; H04B 1/7097; H04B 7/18515; H04B 7/0691; H04B 7/19; H01Q 3/40; H04W 16/28
See application file for complete search history.

(56) References Cited

U.S. PATENT DOCUMENTS 3,017,777 A 1/1962 Haeussermann
3,815,140 A 6/1974 Buehler et al.
(Continued)

FOREIGN PATENT DOCUMENTS

CN 104661276 A 5/2015
CN 106788682 A 5/2017
(Continued)

OTHER PUBLICATIONS

Cox, Donald C., "Wireless Network Access for Personal Communications," IEEE Communications Magazine (Dec. 1992), pp. 96-115.
(Continued)

*Primary Examiner* — Iqbal Zaidi
(74) *Attorney, Agent, or Firm* — David M. Quinlan, P.C.

(57) ABSTRACT

A radio communication route enables communication from an originating ground station to a destination ground station via one of multiple randomly orbiting satellites with no active attitude control. The ground stations and satellites include multi-feed parabolic antennas for receiving radio signals from and transmitting radio signals in multiple directions. The satellites store an address of a destination ground station from which an initial information signal is transmitted and antenna information identifying the satellite antenna feed on which the initial information signal was received. Plural satellite antennas transmit linking information identifying the satellite to the originating ground station. Data transmissions received at the originating ground station that designate a particular destination are transmitted by the originating ground station using the antenna on which the linking information was received and the satellite retransmits the data transmission using the satellite antenna feed identified by the stored antenna information.

24 Claims, 8 Drawing Sheets

Related U.S. Application Data division of application No. 15/719,611, filed on Sep. 29, 2017, now Pat. No. 10,085,200.

(51) Int. Cl.

| | |
|---|---|
| *H01Q 1/28* | (2006.01) |
| *H04W 40/12* | (2009.01) |
| *H04B 7/185* | (2006.01) |
| *H04L 12/26* | (2006.01) |

(52) U.S. Cl.
CPC .......... *H04L 43/0847* (2013.01); *H04L 43/18* (2013.01); *H04W 16/28* (2013.01); *H01Q 1/288* (2013.01); *H01Q 15/14* (2013.01)

(56) References Cited

U.S. PATENT DOCUMENTS

| | | | |
|---|---|---|---|
| 4,937,822 | A | 6/1990 | Weddle et al. |
| 4,965,850 | A | 10/1990 | Schloemer |
| 5,274,840 | A | 12/1993 | Schwendeman |
| 5,303,286 | A | 4/1994 | Wiedeman |
| 5,410,728 | A | 4/1995 | Bertiger et al. |
| 5,551,624 | A | 9/1996 | Horstein et al. |
| 5,566,354 | A | 10/1996 | Schloemer |
| 5,574,968 | A | 11/1996 | Olds et al. |
| 5,604,920 | A | 2/1997 | Bertiger et al. |
| 5,716,029 | A | 2/1998 | Spitzer et al. |
| 5,757,784 | A | 5/1998 | Liebowitz et al. |
| 5,793,842 | A | 8/1998 | Schloemer et al. |
| 5,812,545 | A | 9/1998 | Liebowitz et al. |
| 5,959,999 | A | 9/1999 | An |
| 6,208,312 | B1 | 3/2001 | Gould |
| 6,219,003 | B1 | 4/2001 | Chandler |
| 6,295,283 | B1 | 9/2001 | Falk |
| 6,404,769 | B1 | 6/2002 | Kapoor |
| 6,459,899 | B1 | 10/2002 | Schloemer |
| 6,775,251 | B1 | 8/2004 | Wiedeman et al. |
| 6,823,170 | B1 * | 11/2004 | Dent ................. H04B 7/18515 342/368 |
| 6,985,454 | B1 | 1/2006 | Wiedeman et al. |
| 7,292,186 | B2 | 11/2007 | Miller et al. |
| 7,502,382 | B1 | 3/2009 | Liu et al. |
| 7,925,167 | B1 | 4/2011 | Kozubal et al. |
| 8,918,047 | B1 | 12/2014 | Teller et al. |
| 9,035,839 | B2 | 5/2015 | Scott et al. |
| 9,748,989 | B1 * | 8/2017 | Freedman ............ H04B 7/2041 |
| 10,063,309 | B2 | 8/2018 | Laufer et al. |
| 10,084,536 | B1 | 9/2018 | Schloemer |
| 10,084,615 | B2 | 9/2018 | Hong et al. |
| 10,291,316 | B1 | 5/2019 | Schloemer |
| 10,447,381 | B2 | 10/2019 | Schloemer |
| 10,742,311 | B2 | 8/2020 | Speidel et al. |
| 2005/0207375 | A1 | 9/2005 | Schiff |
| 2006/0023717 | A1 | 2/2006 | Trachtman et al. |
| 2007/0070939 | A1 | 3/2007 | Hottinen |
| 2007/0075896 | A1 | 4/2007 | Whitehead et al. |
| 2008/0056189 | A1 | 3/2008 | Hudson et al. |
| 2008/0219266 | A1 | 9/2008 | Agarwal et al. |
| 2008/0278397 | A1 | 11/2008 | Rao et al. |
| 2010/0217879 | A1 | 8/2010 | Weiner |
| 2013/0148250 | A1 | 6/2013 | Day et al. |
| 2013/0293415 | A1 | 11/2013 | Gutt et al. |
| 2014/0027576 | A1 | 1/2014 | Boshuizen et al. |
| 2014/0177522 | A1 | 6/2014 | Marshack et al. |
| 2014/0240449 | A1 | 8/2014 | Shefer |
| 2015/0131512 | A1 | 5/2015 | Lauer et al. |
| 2016/0037434 | A1 | 2/2016 | Gopal et al. |
| 2016/0080072 | A1 | 3/2016 | Baudoin et al. |
| 2016/0112117 | A1 | 4/2016 | Platzer et al. |
| 2016/0365629 | A1 * | 12/2016 | Yao .......................... G01S 19/13 |
| 2018/0156924 | A1 | 6/2018 | Reedy et al. |

FOREIGN PATENT DOCUMENTS

| | | |
|---|---|---|
| EP | 1523062 | 4/2005 |
| IN | 4263/CHE/2013 | 3/2015 |

OTHER PUBLICATIONS

Satellite Systems Engineering in an IPv6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Iridium (last visited May 9, 2017).
"Project Loon," Wikipedia, https://en.wikipedia.org/wiki/Project_Loon (last visited Sep. 27, 2017).
Wade, P., "Multiple Reflector Dish Antennas," copyright 2004.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
International Search Report and Written Opinion dated Nov. 12, 2019, in PCT appln. No. PCT/US2019/041428.
Supplementary European Search Report dated Feb. 25, 2020, in EP appln. No. 17844319.8 (PCT/US2017/048110).
Chakraborty, D., "Survivable Communication Concept Via Multiple Low Earth-Orbiting Satellites," IEEE Transactions on Aerospace and Electronic Systems, vol. 25, No. 6 (Nov. 1989), pp. 879-889.
Chung, Soon-Jo, et al., "Review of Formation Flying and Constellation Missions Using Nanosatellites," Journal of Spacecraft and Rockets, vol. 53, No. 3, pp. 567-578 (May-Jun. 2016).
Qu, et al., "LEO Satellite Constellation for Internet of Things," IEEE Access, vol. 5, pp. 18391-18401, Digital Object Identifier 10.1109/ACCESS.2017.2735988, first pub. Aug. 4. 2017 (Sep. 27, 2017).
EPO office action in EP appln. No. 18860787.3-1215, dated May 21, 2021.

* cited by examiner

RADIO SYSTEM USING NODES WITH HIGH GAIN ANTENNAS

BACKGROUND OF THE INVENTION

Field of the Invention

The present invention relates to antennas for nodes in systems automatically establishing radio routes comprising radio links between ground station nodes via one or more unguided or substantially unguided aerial nodes such as satellites traveling in random or quasi-random routes, and more particularly, to antenna designs that increase the probability of creating radio links between system nodes.

Description of Related Art

A brief history of certain aspects of cellular telephony relevant to the present disclosure is set forth in U.S. Pat. No. 5,793,842, which names as an inventor Jerry R. Schloemer, who is also the present inventor. One early system architecture, still in use today, involved a limited number of tower-mounted transceivers ("drops") and plural mobile radios ("cellular telephones"). In these early systems, and still in some cases today, a central computer controlled communications between land lines connected to the towers and the mobile radios. Implementing this system architecture required significant investment in infrastructure and computing power, especially as the increasing popularity and technical capabilities of cellular telephones necessitated increased system capacity and sophistication. An alternate system architecture involved using radio transceivers ("nodes") mounted on existing structures, such as buildings and telephone poles. These architectures use nodes capable of receiving and transmitting signals to and from cellular telephones along a radio route among the nodes to drops at selected nodes. This came to be called a mesh network, an early example being the system disclosed in Cox, Donald C., "Wireless Network Access for Personal Communications," *IEEE Communications Magazine* (December 1992), pp 96-115.

A particular challenge in implementing mesh systems was how to determine the best available radio routes for interconnecting the nodes. Generally, early mesh systems still required a central computer to make routing determinations, which added to system complexity and cost. Other approaches, such as that described in U.S. Pat. No. 4,937,822 to Weddle et al., involved a mesh system in which routes would be established automatically, that is, without a central computer. However, Weddle disclosed such a system only in a mesh in which the nodes are laid out in a regular rectangular grid and radio routing links can only be between nodes orthogonally adjacent to each other (that is, cater-corner links between nodes would not be permitted). The shortcomings of such a system will be immediately apparent to those skilled in the art, if for no other reason than in a real-world setting it would be very difficult, if not impossible, to distribute nodes in a strictly orthogonal, uniformly-spaced rectangular grid over a wide enough area to make the system practicable. Moreover, Weddle does not disclose in detail any algorithm by which the nodes would actually create a preferred radio route.

Against that background the present inventor's U.S. Pat. No. 5,793,842 disclosed a system and method of creating radio routes through a mesh of nodes that were not limited in their placement and did not require a central computer. The systems and methods described in detail further below in connection with the present invention take advantage of technology described in U.S. Pat. No. 5,793,842 relating to the creation of radio routes through plural, randomly located nodes and the transmission of communications using those routes. To avoid the necessity of setting forth here the details of these types of systems and methods, the disclosure in U.S. Pat. No. 5,793,842 relating to route creation, and digital and analog signal transmission using the routes thus created, is incorporated herein by reference as if set out in full.

The inventor improved on that technology in his later U.S. Pat. No. 6,459,899, which, among other things, describes a system that uses nodes with directional antennas to improve the route creation and communication transmission capabilities of the earlier system. This improvement solves complex issues presented by using nodes with directional antennas in the systems and methods described in the '842 patent, and thus takes advantage of the higher quality radio links achievable with directional antennas. The present invention also uses the technology disclosed in the '899 patent, and its descriptions of route creation are incorporated by reference herein.

Before the inventor's approach to creating routes through a radio mesh network with randomly distributed nodes and no central computer, others were proposing ways to provide worldwide cellular coverage using satellites for call transmission between earth-based originating and destination drops. An example of a satellite system that was actually commercialized is disclosed in various patents such as U.S. Pat. No. 5,274,840 to Schwendeman and U.S. Pat. No. 5,410,728 to Bertiger et al., both of which are assigned to Motorola, Inc. This system utilized satellites evenly distributed in a predetermined number of polar orbits as transceivers for signals between satellites and between satellites and transceivers on the ground. A sufficient number of satellites is used to provide coverage of the entire globe. However, in practice this system, which was commercialized by Iridium, had numerous drawbacks. One was that each satellite needed onboard thrusters, rocket fuel, and navigational hardware to maintain its desired orbit. This increased satellite size and weight, which increased the launch cost, as well as increasing the cost of the satellite itself. Also, to account for inevitable satellite failures, extra satellites would have to be maneuvered into a failed satellite's orbit, thus increasing the cost of the entire system by requiring extra satellites and their concomitant high manufacturing and launch costs. See, for example, "Iridium Satellite Constellation," Wikipedia, https://en.wikipedia.org/wiki/Iridium (last visited May 9, 2017). Ground-based orbit and attitude control using complex computer technology further increased system costs. In the end, its drawbacks made the system commercially unviable for mass market applications, although it is believed to have found use in specialized areas such as military applications and reporting by journalists from remote areas.

In addition to maintaining each Iridium satellite in a particular orbital position relative to the earth and other satellites, the attitude of each satellite also had to be maintained within certain tolerances so that its antennas would be oriented for effective satellite-satellite and satellite-ground radio communications. One way of providing attitude control was using onboard thrusters, which present the drawbacks already discussed. Various mechanically-based inertial attitude control systems have been proposed, such as those described in U.S. Pat. Nos. 3,017,777 and 8,164,294, and in Chabot, J. A., "A Spherical Magnetic Dipole Actuator for Spacecraft Attitude Control," Thesis for M.S. in Aerospace Engrg. Sciences, Univ. of Colorado, 2015. However, it is believed that these types of systems would not perform any better than rocket-based attitude control, while their mechanical complexity and onboard control systems would preclude significant savings in weight as compared to rocket-based attitude control.

The present inventor disclosed in his U.S. Pat. No. 5,566,354 a satellite cellular telephone system that improved on the Motorola-Iridium approach. The inventor's improved approach allowed the satellites to occupy random orbits. This eliminated the orbital control components of satellite systems that relied on each satellite being in a known location relative to the others, such as the Motorola-Iridium system or the wireless telephone/satellite system disclosed in U.S. Pat. No. 5,303,286. However, the random-orbit system described in the '354 patent has certain drawbacks, one of which is that the satellites still require attitude control to insure that the satellite antennas point in the correct directions. Nor, as discussed in detail further below, does it have the advantages of a true mesh system, as that term is used in this description.

Aside from the rapid spread of cellular telephone usage around the world in recent years, access to the Internet through computers and smartphones has become a necessity for businesses and individuals alike. It is difficult to do business or manage personal affairs effectively without access to Internet-based resources like email, electronic banking, investigative/search services, and many others. In addition, social media providers like Facebook and Twitter can only exist in areas of the world that provide Internet access. A satellite-based system presents an ideal way of making the Internet and cellular telephone service available in remote areas without blanketing a country with towers or installing land-based radio mesh nodes across vast areas. However, known satellite systems suffer from numerous drawbacks, some of which are discussed above, and none has been successfully commercialized to date. In fact, a low-cost satellite system would have the potential to replace tower-based systems and ground-based mesh systems altogether.

SUMMARY OF THE INVENTION

It is an object of the present invention to provide a radio communication system comprising a plurality of satellites capable of establishing radio links between orbiting satellites and between the satellites and ground-based stations without requiring the satellites to be maintained in predetermined orbits or in predetermined attitudes relative to each other or the earth. In a preferred embodiment there are a sufficient number of satellites to provide a satellite mesh that ensures almost to a certainty that any spot on the earth's surface will be within sight of at least one satellite at all times. One specific embodiment utilizes at least 200 satellites.

One aspect of the invention rests in part on incorporating in each such satellite a plurality of antennas capable of transmitting and receiving in all directions. A radio link can be created when a radio beam transmitted from an antenna in one satellite is received by an antenna in another satellite. This is sometimes referred to herein as a "beam match." The inventor recognized that using a unique antenna arrangement and uniquely coded radio transmissions from the satellites and ground stations, and treating both as nodes in a mesh, would enable a radio route to be established between ground stations by assembling radio links via one or more of the satellites. One insight that led to this aspect of the invention is that the satellites' attitudes and relative positions change sufficiently slowly as compared to the time that it takes the on-board computers in each satellite to calculate a radio route. Accordingly, once the radio route is established, communications ("calls") between the ground stations via one or more of the satellites are not normally disrupted or, in the event that an existing route is disrupted as a satellite moves or tumbles, a new radio route can be established "on the fly" with the same or different satellites while the call is in progress. As used in the description that follows, a "call" is a communication of content (digital or otherwise) over a radio route between satellites or between a satellite and a ground station, unless otherwise indicated explicitly or by context. While not limited as such, the systems described herein are particularly well suited for the transmission of data in packets, defined here in the generally accepted sense as a collection of digital data with a portion representing the content of the transmission (sometimes referred to as the "payload"), and a control portion (sometimes referred to as a "header" or "trailer"), which contains information enabling the payload to be delivered successfully, such as source and destination addresses, error detection codes, and sequencing information.

In one of its more general aspects the present invention uses a unique satellite construction with on-board computers that can perform calculations and select antennas to create radio routes between ground stations via one or more satellites virtually in real time as the satellites move in uncontrolled orbits with no attitude control. The radio routes are determined by algorithms executed by the computers in the satellites, so that a central computer is not needed to specify which satellite or satellites will comprise an optimum radio route between ground stations.

One embodiment of the invention uses the disclosed satellite mesh to create an optimum radio route that comprises a single satellite that provides a radio route between two ground-based transceivers. The unique satellite design described herein enables a single-satellite route to be maintained even as the satellite tumbles with no attitude control or if conditions change so that another satellite in sight of the ground-based transceivers will provide a better radio route because the first satellite drifted out of range or became inoperative for some reason.

A particular advantage of the system disclosed herein is that in a preferred embodiment it provides the above features and those described in more detail below by blanketing the earth with lightweight, battery-powered satellites that reduce launch costs and eliminate the necessity for complex and costly control systems for maintaining the satellites in particular orbits and in particular attitudes. Another aspect of the invention uses ground stations with an antenna arrangement different from that used in the satellites, since the limitations on satellite weight, size, and power do not apply to the ground stations. This means that the ground stations can have a greater antenna density (more antenna beams over a given spherical area) and use antennas with more power (gain), thus virtually ensuring that data communications will be possible between any two ground stations.

Another embodiment of the invention enhances the ability of the satellites to establish radio links between satellites and between a satellite and a ground station by using satellites that spin or rotate about an axis. This increases the probability of creating a beam match between two satellites because each satellite is likely to "see" more antennas on other satellites during a given period of time. This enables the use of higher-gain antennas with correspondingly narrower beam widths, thus increasing the strength of the radio links and the reliability of call transmissions. Typically, the satellites are deployed with a predetermined angular velocity, which may be different for different satellites. In one variation of this embodiment, the system includes satellites that rotate in opposite directions. Further considerations for realizing this embodiment are discussed in the detailed description that follows.

Yet another embodiment of the invention further enhances the ability of the system to establish radio links between system nodes (satellites and ground stations) by using multi-feed parabolic antennas to transmit plural radio beams from each antenna over a prescribed spherical area. The antennas have larger reflectors than single-feed antennas used in other embodiments so that each radio beam has more gain. Although the satellites according to the present embodiment will likely be larger and heavier than satellites with a comparable number of single-feed antennas, they will transmit a greatly increased number of high-gain radio beams available for creating beam matches representing higher quality radio links between system nodes.

Additional applications of systems and methods described herein relate to the incorporation of any of the node embodiments on various aerial vehicles other than low earth orbit satellites. These vehicles can include, without limitation, very low earth orbit satellites (100-200 miles) that provide less signal attenuation of radio signals between themselves and ground nodes and might be adaptable for use in systems interconnecting the so-called Internet of Things, high-altitude balloons (for example, 11 miles) that can be adapted for systems designed to bring Internet service to rural areas, and drones flying at 1000-2000 feet that could increase the ability of the system to create radio links directly with individual hand-held devices. In addition, an adaptation of the multi-feed antenna embodiment described above used in ground stations will increase the probably that radio links can be established directly between ground stations at varying elevations without involving any aerial nodes.

These and other aspects and features of the invention and embodiments thereof will be covered in more detail as this description proceeds.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 2, comprising

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein. It will also be understood that terms indicating direction or orientation may be used facilitate description. The use of such terms does not imply that the claimed subject matter is limited to a particular orientation of the structure being described.

1. Radio Mesh Concepts and Principles

The system described herein builds on certain principles underlying the use of a plurality of transceivers ("nodes") that can be used to form termination points for links in a radio route using one or more of the transceivers. Throughout the description herein, the term "radio," "radio signal," or the like is not limited to references to electromagnetic radiation in frequencies commonly referred to as radio waves. It is meant to encompass electromagnetic radiation of any frequency capable of transmitting information, including light, microwaves, VHF ("very high frequency"), UHF ("ultrahigh frequency"), etc. The discussion in this section describes certain relevant features of prior art arrangements sometimes referred to as mesh systems, and some of the basic concepts that represent the significant advances over known mesh technology achieved by the unique apparatus, systems, and methods described herein.

A. Prior Art Mesh and Satellite Radio Communication Systems

Figure 1A:
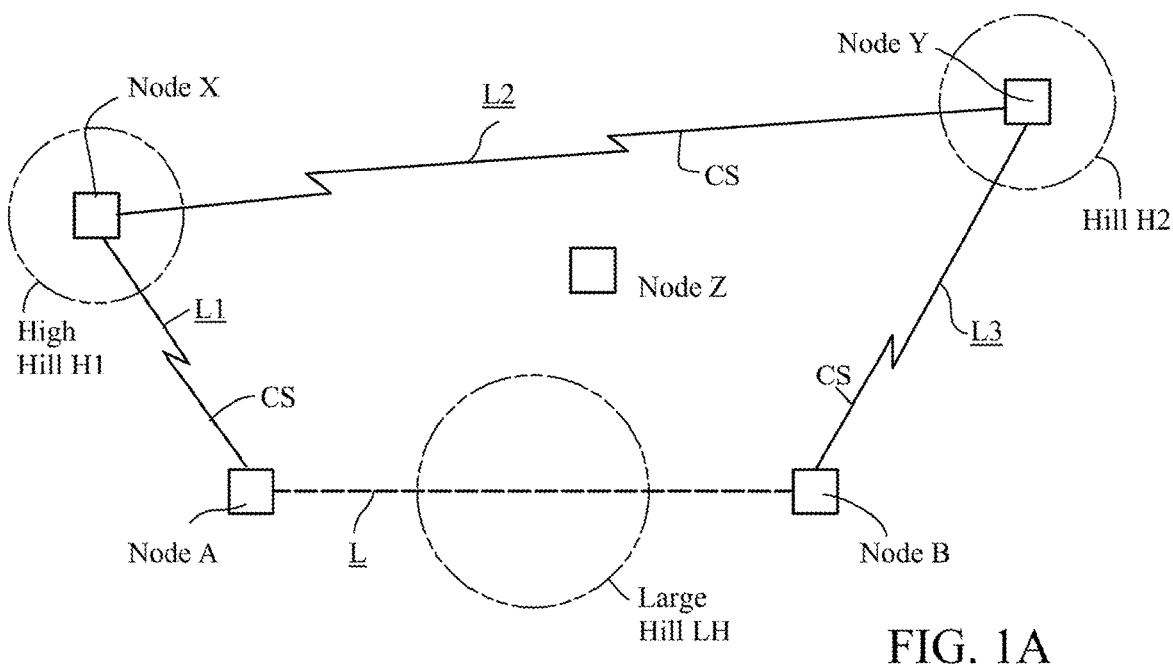
FIG. 1, comprising FIGS. 1A and 1B, schematically depicts the radio mesh concept disclosed in the inventor's U.S. Pat. Nos. 5,793,842 and 6,459,899.
Figure 1B:
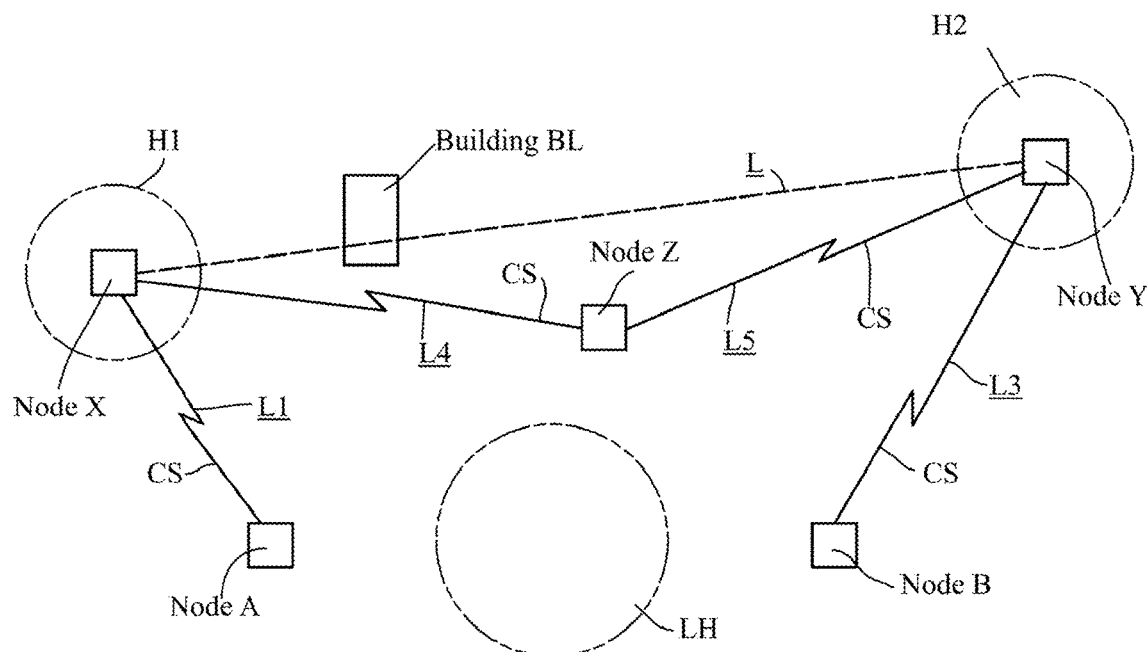

Existing ground-based radio mesh systems such as those described in the inventor's U.S. Pat. Nos. 5,793,842 and 6,459,899 have proven very effective in establishing radio routes for digital and analog communication signals through a plurality of nodes. They are capable of establishing high quality radio links in a mesh system that allows nodes to be placed at convenient locations rather than in a predetermined pattern. FIGS. 1A and 1B illustrate such a ground-based radio mesh. In this simplified example, communication signals CS can be transmitted between an originating node A and a nearby mobile radio (not shown), such as an Apple Inc. iPhone® or Samsung Electronics Co., Ltd., Galaxy® so-called smartphone. Those signals must be in turn communicated to a "drop," such as a node B, which can be an Internet router or a telephone network, for example, connected to a land line. If the nodes A and B are not in line-of-sight contact because of the presence of an obstruction between them, such as a large hill LH (FIG. 1A), a direct radio link L may be subject to a severe reduction in signal strength, if it is possible to establish a link at all.

As described above, many mesh systems proposed before those described in U.S. Pat. Nos. 5,793,842 and 6,459,899, used a central computer to control routes between originating nodes and drops. However, the patents disclosed systems that utilized algorithms to enable the nodes themselves to establish a preferred route between as many intermediate nodes as needed to optimize communications between an originating node and a destination node. For example, FIG. 1A shows a system in which software and firmware in the nodes themselves establish a preferred route around the hill LH, comprising a radio link L1 between the node A and a node X on top of a first high hill H1. The nodes use a link L1 between nodes A and X, even though the link actually leads in a direction away from the destination node B. The algorithms resident in the individual nodes then establish a radio link L2 with another node Y on top of a second hill H2, and thence to the destination node B. In this preferred route, a node Z in the mesh, which may be part of a radio route between two other nodes (not shown), is bypassed because the nodes X, Y, and Z self-determine that the preferred route is through the nodes X and Y.

One of the important features of this system is that the nodes themselves can also create a different preferred route, say between the nodes X and Y through a node Z using links L4 and L5, if conditions change after placement of the nodes. FIG. 1B shows how the nodes themselves can create a different route between nodes A and B if there is no clear line of sight between them. In this example, the line of sight has been interrupted by a building BL constructed directly between the nodes X and Y. Another example would be a tree that permits radio signals to pass between the nodes X and Y during the winter because it has no leaves, but disturbs a radio link in the summer when its leaves have come out. In such a case, the systems described in U.S. Pat. Nos. 5,793,842 and 6,459,899 enable the nodes A, B, X, Y, and Z automatically to create a new preferred radio route using the new radio links L4 and L5 between the nodes X, Y, and Z.

These patents thus describe systems that use a mesh of nodes capable of essentially random distribution in which the nodes themselves establish preferred radio routes between destinations and drops using the onboard computational capabilities in the nodes to analyze radio signals exchanged by the nodes. This eliminates the need for a central computer to communicate with the nodes and determine optimum or preferred routes using data collected by the nodes from multiple other nodes in the mesh. Generally speaking, the only limitation on the placement of the nodes is that intermediate nodes in a route of three or more nodes should be within sight of at least two other nodes. This allows the system to cover a wide area, and although it may require a large number of nodes to do so, as long as nodes can "see" each other the system will be able to self-establish preferred radio routes.

However, it is not obvious how general concepts behind radio mesh systems comprising fixed-location, ground-based receiving and transmitting nodes can be adapted to a system in which the nodes are satellites orbiting the earth. The Motorola-Iridium system disclosed in U.S. Pat. Nos. 5,274,840 and 5,410,728 is more or less an analog of ground-based systems with nodes in particular locations. That is, it requires the satellites to maintain predetermined orbits and have onboard attitude control to keep the satellite antennas pointing in the right direction, and relies on knowing the locations of the satellites when they receive a transmission from one ground station and retransmit it to another. While this approach works technically, it is believed to have proved impracticable from a commercial standpoint because it was too costly to implement, although as noted above, it still has utility in certain specialized applications. In addition, it uses a central computer to establish radio routes among the satellites.

The inventor's U.S. Pat. No. 5,566,354 discloses a system using random-orbit satellites, but as noted above, it is not actually a mesh system as that term is used herein. For example, the system in the '354 patent establishes a communication channel between ground-based mobile units by having an originating unit send a page to a destination unit to determine if a satellite is available for the purpose, and then simply transmits communications between the two units through that satellite. The system does not have numerous salient features of the mesh system described herein, such as creating preferred radio routes using the quality of signals transmitted to and received by multiple nodes. In addition, the satellites still require expensive onboard attitude control hardware such as positioning thrusters and rocket fuel for them, both of which add extra weight and thus increase the cost of delivering the satellites into orbit. The present system, on the other hand, uses satellites that continuously update the antennas in the nodes (satellites and ground stations) to enable a choice to be made as to the antennas at the nodes that will provide the highest quality radio link between the nodes, whether they be satellites or ground stations. In addition, the '354 patent does not disclose how to provide satellite-to-satellite communications between randomly orbiting satellites. And although the Motorola-Iridium system supports satellite-to-satellite communications, its satellites have to maintain both prearranged orbits and fixed attitudes.

B. Principles of the Unique Satellite Radio Mesh Systems Described Herein

The satellite radio mesh used in the present system supports radio routes in which the preferred route between two ground stations includes more than one satellite and having one or more satellite-to-satellite radio links. It also supports radio routes that include a single satellite in communication with both ground stations. In both embodiments a large number of unique satellites, described further below, are launched into orbit. The number of satellites is chosen to provide a high probability that at any given moment, a point on the surface of the earth will be within line of sight of a certain number of satellites. For example, U.S. Pat. No. 5,566,354 estimates that if 200 satellites were randomly placed at an orbital altitude of 500 miles, a given point on the earth would "see" on average over time about 12 satellites, or stated another way, the chances of a given spot on the earth not being in the line of sight of at least one satellite is only four in 1,000,000.

Figure 2A:
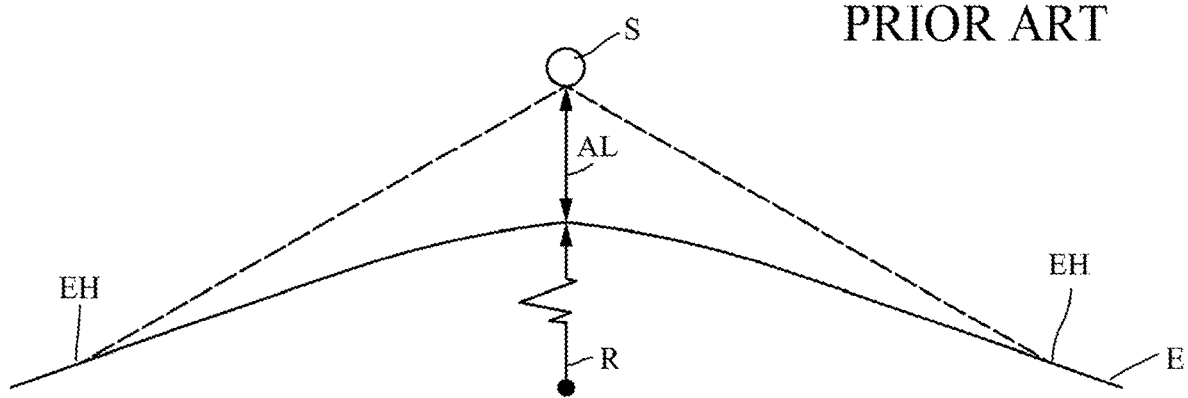
FIGS. 2A and 2B, illustrates certain geometric principles underlying the space-based radio systems disclosed and claimed herein.
Figure 2B:
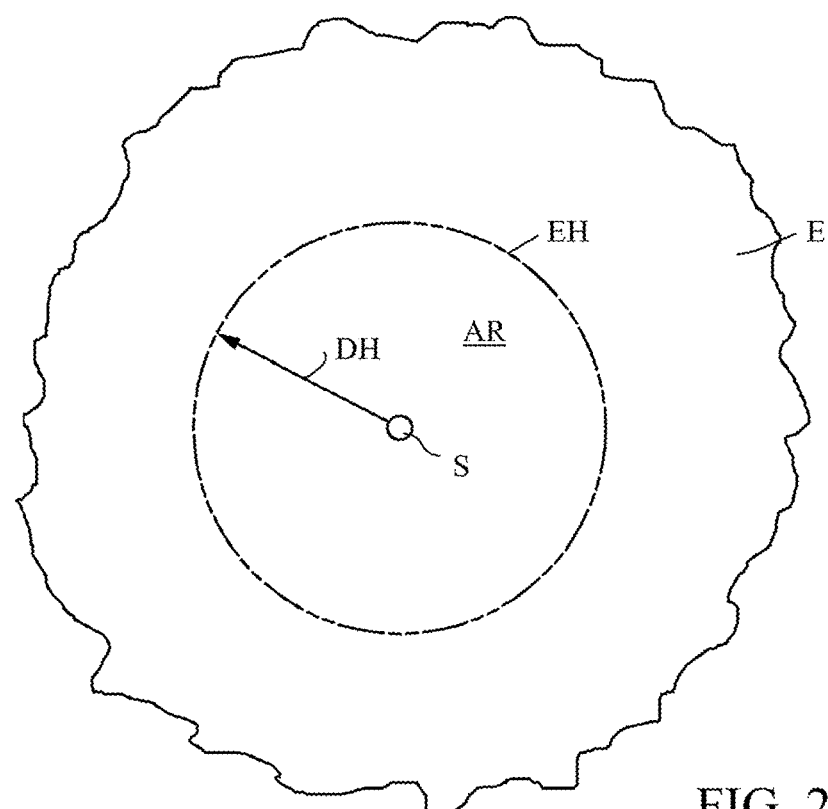

FIGS. 2A and 2B illustrate this principle graphically. The approximate distance DH to the horizon EH from a satellite S at an altitude AL of 500 miles can be calculated according to the formula $DH=[(R+500)^2-R^2]^{1/2}$, where R is the radius of the earth E. Depending on the value chosen for R, DH is about 2000 miles. Thus, the area of coverage AR of a satellite is it $\pi \times DH^2 \approx 12,500,000$ sq. mi. Taking the surface area of the earth as 197 million square miles, each satellite thus "covers" about 6% of the earth's surface, which means that on average any one point on the surface will "see" about 12 satellites (200×0.06). Conversely, the chance that a single satellite will not be visible from any particular point on the earth is 94%. If there are 200 satellites launched into random orbits, the probability that any given point on the earth will not see at least one satellite is only $0.94^{200} \approx 0.0004\%$ (that is, four in a million). The '354 patent includes a table, incorporated herein by reference, that shows the estimated probability of constant coverage over time of a point on the surface for different numbers of satellites.

It should be noted that the term "random orbits" in the context of the present description must be considered in combination with the number of satellites used in the system. It generally means that a sufficient number of satellites are placed into orbits that are initially spaced apart with the goal of maximizing coverage of the globe. It is not meant to require random distribution in a pure mathematical sense. Rather, it is used to indicate that precise positioning of satellites at particular locations is not required, and that the manner of placing them into orbit will take into account the number of satellites comprising the system and the desired degree of certainty, calculated in accordance with suitable statistical algorithms, that any given point on the earth's surface will be within sight of at least one satellite at all times. (It will be appreciated that the system permits different satellites to satisfy that requirement for a given point as the satellites' orbits change over time.) For example, known techniques for generating so-called pseudorandom numbers can be used as a basis for calculating initial satellite numbers and placement. Other ways of achieving "random" satellite distribution are described in U.S. Pat. No. 5,566,354 in the "Satellite Launch" section, which is incorporated herein by reference. The number of satellites launched into orbit will preferably be in excess of a calculated number to enable continued full earth coverage by accounting for a certain number of satellite failures over time, or for satellites that are destroyed by reentry into the earth's atmosphere because of orbit decay or damaged by space debris.

Another important feature of the system described and claimed herein is that the satellites do not require active, onboard attitude control. Thus, they do not require any moving parts, mechanisms, or propulsion systems, which reduces satellite weight and cost, and they can be released into orbit without regard to their angular orientation. It is expected that satellites can deployed from a launch vehicle such as a space station or the like. It will be preferable in some embodiments of the system described herein to attempt to deploy them with as little angular velocity as possible, but no special effort is required in that regard. Systems in accordance with such embodiments will create radio routes even if the satellites "tumble," meaning that each satellite can change its angular orientation at a rate different from other satellites, or not at all, as it orbits. Stated another way, the satellites are neither in prescribed orbits nor in controlled orientations. It is possible in some implementations to distribute the mass of the satellites and/or components comprising ferromagnetic materials to maintain a certain amount of tumbling as they orbit the earth and interact with its gravitational and magnetic fields. In addition, the size and orientation of solar panels used to produce electrical power (see FIGS. 3 and 4) can be judiciously selected to employ the kinetic energy of photons striking the panels to provide forces that influence the tumbling motion of the satellites. If desired, each satellite can include tracking telemetry to detect when its orbit is decaying and it needs to be replaced, and to comply with any national or international protocols applicable to orbiting bodies. However, it is expected that it will be relatively simple and inexpensive to provide such telemetry.

In another embodiment the satellites are deployed in random orbits with an angular velocity imparted to them. In the manner described further below, this enables the use of higher gain antennas to create beam matches even though the radio beams may be narrower. This enhances the ability of the system to more readily create radio routes using more than one satellite, which has the potential in some settings to increase the quality of the routes between ground stations and thereby facilitate data transmissions. In still another embodiment, the satellites incorporate parabolic antennas with multiple feeds to increase the number of high-gain beams potentially available for use as radio links between system nodes. Details of these embodiments are described in detail further below.

II. Satellite Design: Antenna Configuration and Onboard Control Circuitry

The satellites according to one embodiment comprise system nodes that utilize unique multiple antenna arrays and software-implemented algorithms to create radio routes by enabling the nodes to nearly instantaneously identify an antenna transmitting information signals and an antenna in another node receiving information signals from that transmitting antenna. Because the satellites and ground stations are generally equivalent vis-à-vis their function as nodes in the system, the term node can refer to both satellites and ground stations, unless otherwise stated or the context indicates otherwise. In addition, software resident in each node uses content in the information signals to evaluate the suitability of these antenna pairs as a radio link between two nodes. Software resident in the nodes uses that evaluation to create a preferred radio route for sending data communications from an originating ground station to a destination ground station. For purposes of explaining basic concepts involved in creating radio routes using the satellite system described herein, this discussion sometimes treats certain aspects of route creation separately. For example the concept of identifying antenna pairs for potential radio links may be described separately from identifying a preferred radio route selecting certain links for a radio route. Nevertheless, it will be clear as the discussion proceeds that route creation involves a combination of steps that begins when ground nodes send initial information signals and culminates with the creation of a preferred radio route for communication signals from an originating ground node through one or more satellite nodes to a destination ground node.

The disclosed system and route creation process enables the use of satellites that drift in random orbits with no attitude control. Data communications can be transmitted and received even if the selected pair of antennas on the nodes changes over time, or if the satellites comprising the route change over time. That is, computers onboard the satellites and at the ground stations are capable of changing the radio route during a given communication or from one communication to the next. In addition, a radio route might utilize different satellites during a single communication. Or a first communication between ground stations at a first time could use a certain satellite or satellites, while a later communication between the same two ground stations might use one or more satellites not used in the first communication.

Figure 3:
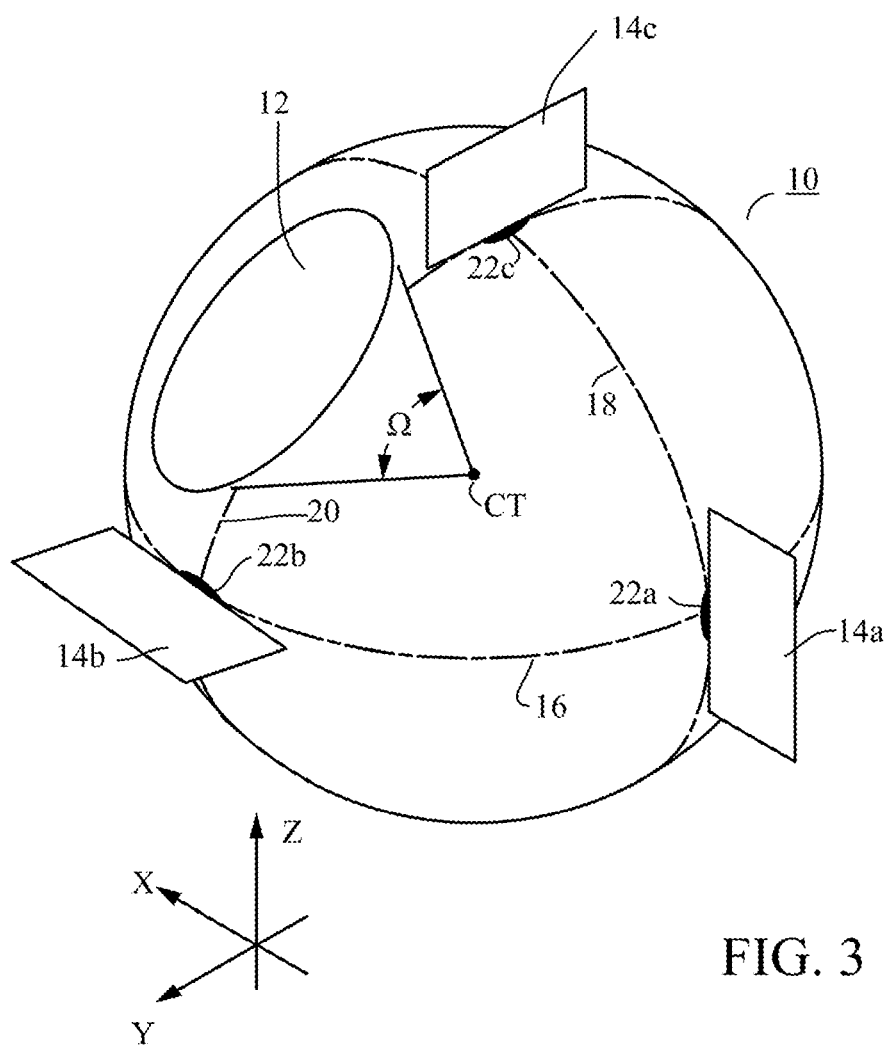
FIG. 3 schematically depicts an embodiment of a satellite suitable for use in the space-based radio systems disclosed and claimed herein.

FIG. 3 is a schematic depiction of an embodiment of a satellite 10 that can be used in the space-based radio mesh systems described herein. To facilitate understanding of certain principles underlying the operation of the satellite 10 in the systems and methods described herein, it is shown with an outer casing 12 in the shape of a sphere centered at CT. Those skilled in the art will recognize that the satellite can have a different shape if so dictated by other design considerations. Certain features of the satellite will be described with reference to a coordinate system having mutually orthogonal x, y, and z axes. It will be understood as this description proceeds that one of the features of the space-based radio system disclosed and claimed herein is that the satellite can assume any angular orientation as it orbits the earth, as already discussed. It will be appreciated by those skilled in the art from the description thus far that the coordinate system shown in FIG. 3 is used strictly for purposes of illustration in describing features of the satellite. Put another way, the coordinate system can be considered to be tied to the satellite and to change its angular orientation with respect to the earth as the satellite slowly tumbles.

The exemplary satellite 10 includes a plurality of antenna modules 12, one of which is depicted schematically in FIG. 3 for purposes of illustration. Each antenna module in this example comprises a directional antenna that transmits and receives radio signals at greater powers in predetermined directions. The present embodiment uses circular dish parabolic antennas each of which occupies a solid angle $\Omega$ with a vertex at the center CT of the spherical satellite. The number of discrete antenna modules incorporated into the satellite will depend on the particular application of the system and the antenna design. In one embodiment $\Omega$ in steradians will be chosen so that a particular number of antenna modules, distributed around the satellite, will be capable of transmitting radio signals to and receiving radio signals from a sufficiently large spherical area to enable radio signals to be received from and transmitted to ground station transceivers and antennas in other satellites to effect operation of the system in the manners described below. The actual configuration of the antenna modules 12 can be determined using known antenna design principles to achieve that goal.

However, fundamental principles of antenna operation demonstrate the technical feasibility of equipping a satellite such as that depicted in FIG. 3 with a sufficient number of antennas to effect the system and methods described herein. One design approach could specify that the beam width of the antenna for each module must provide a certain probability that signals transmitted from all of the antennas in a particular satellite will be received at another satellite or a ground-based transceiver. A typical manner of expressing beam width for a circular dish parabolic antenna is the angle $\alpha$ at which the power of the beam has decreased by 3 dB. This is referred to as the half-power beam width (HPBW) and is given by the relationship:

$$\alpha = \frac{k \times \gamma}{d} \quad (1)$$

where $\alpha$ is in degrees, k is a factor that depends on certain design parameters of the antenna and is typically assigned a value of 70°, $\gamma$ is the wavelength in centimeters, and d is the diameter of the circular "mouth" of the antenna reflector. *Satellite Systems Engineering in an IPv6 Environment*, Minali, Daniel, CRC Press, Boca Raton, Fla. (2009), pages 78-80. For a 5 GHz signal, which is a common radio frequency (microwave C band) used in satellite communications, $\gamma$=6 cm ($\gamma$=c/f, where c=speed of light, $3 \times 10^{10}$ cm/sec), so a $\alpha \approx 140°$, but it is not certain that a radio beam transmitted by an antenna with a diameter d=3 cm, as described in the inventor's U.S. application Ser. No. 15/656,111, filed Jul. 21, 2017, would have sufficient energy. If the diameter were twice the wavelength, which is more in line with conventional antenna design, the diameter of the antenna reflector would be 12 cm, making its HPBW=35°. Under reciprocity principles, the same parabolic antenna would receive signals arriving at 17.5° off-axis at −3 dB of its on-axis gain.

A satellite used in the present system will have to be large enough to accommodate the various electronic and mechanical components required for satellite operation, discussed below in detail in connection with FIG. 4, as well as being sufficiently robust in construction to withstand the stresses of launch and long-term exposure to the hostile environment it will encounter in orbit. The inventor's U.S. application Ser. No. 15/656,111 describes a satellite perhaps as small as 20 cm in diameter, but a more practical goal at least for first generation systems would be in the range of 60-70 cm, using antennas 12 cm in diameter with antenna feeds about two wavelengths from the antenna reflectors. The opening at the surface of the satellite for each antenna will be a size that permits the beam from the reflector below the surface to spread unimpeded. If the opening in the satellite is a circle about 18 cm in diameter, its area is about $81 \pi$ cm$^2$($\pi \times$(9 cm)$^2$). For a satellite about 60 cm in diameter, 25 such antennas will occupy about 60% of the satellite surface.

It will be appreciated that satellites and antennas suitable for use in the present mesh system can take different forms depending on trade-offs familiar to those skilled in engineering complex systems. As described further below in more detail, one of the steps in creating a radio route using the embodiment of a satellite mesh described herein is the transmission of identifying messages from all of the antennas in one or more satellites and ground-based transceivers, which in certain contexts are referred to herein interchangeably as "nodes." It will be seen that increasing the number of antennas in a node will increase the total spherical coverage of radio signals transmitted from and received by other nodes, which in turn will increase the probability that a signal from one node will be received at another. It will be further appreciated that more antennas per satellite might make it possible to reduce the number of satellites placed in orbit. Such satellites might be more expensive and heavier, thus increasing launch costs, but other factors might offset the increased cost because fewer satellites might need to be launched. Those skilled in the art will also recognize that the system described herein can be implemented with satellites having antenna arrays that transmit with less than full 360° spherical coverage.

By the same token, the increased weight of a ground station due to adding antennas is not a factor. Thus, a system might incorporate satellites with fewer antennas than the ground stations. It might also be more feasible to design the satellites with a given number of antennas and use statistical estimates to calculate the number of such satellites needed to ensure that a predetermined number is visible from any given point on the earth's surface. After the satellites are launched into orbit, the system could be tested to confirm the calculations and more satellites could added if desired. Moreover, the present example uses parabolic antennas to explain certain principles involved in node design, but the system does not rely on using a particular type of antenna.

That is, the type of antenna and the specific antenna design will also be factors in determining the beam width and number of satellites necessary to ensure to a suitable probability that nodes will receive signals transmitted from other nodes at a useful gain. The factors that determine a successful design for any given implementation of mesh systems as described and claimed herein will be well understood by those skilled in the art. Certain antenna configurations described further below are uniquely designed to increase the probability that a beam match will be created between any two nodes (satellite/satellite and satellite/ground station) in a system.

The satellite 10 also includes a plurality of solar panels, three of which 14a, 14b, and 14c, are shown in FIG. 3. In the illustrated embodiment the solar panels are oriented in mutually perpendicular planes and spaced equidistantly around the satellite 10. For purposes of describing the locations and orientations of the solar panels in this embodiment, a satellite equator 16 is defined as the great circle where the satellite surface is intersected by a plane parallel to the x-y plane and passing through the center CT of the sphere. A zero meridian 18 is defined as the great circle where the satellite surface is intersected by a plane parallel to the x-z plane and passing through the center CT of the sphere. And a normal meridian 20 is defined as the great circle where the satellite surface is intersected by a plane parallel to the y-z plane and passing through the center CT of the sphere. The solar panel 14a is attached to the satellite by suitable mounting structure 22a at the intersection of the equator 16 and the zero meridian 18. The solar panel 14b is attached to the satellite by suitable mounting structure 22h at the intersection of the equator 16 and the normal meridian 18. And the solar panel 14c is attached to the satellite by suitable mounting structure 22c at the intersection of the zero meridian 18 and the normal meridian 20.

The solar panels are generally planar with solar cells distributed over one or both faces for generating electricity when the solar cells are exposed to sunlight. For maximum effectiveness, the planar solar panels are mounted in mutually orthogonal planes to ensure that an adequate number of solar cells are exposed to sunlight regardless of the angular orientation of the satellite. In the depicted embodiment, the solar panel 14a lies in the x-z plane, the solar panel 14b lies in the x-y plane, and the solar panel 14c lies in the y-z plane. It will also be appreciated that the satellite includes three more companion solar panels where the equator, zero meridian, and normal meridian intersect on the other side of the satellite. The companion solar panels (depicted with a prime (') in FIG. 4) are preferably oriented in the same planes as each of their counterparts 14a, 14b, and 14c shown in FIG. 3. Each solar panel is preferably normal to the surface of the satellite so that it does not obstruct the transmission and receipt of radio signals by antennas adjacent to the solar panels.

It will be appreciated that FIG. 3 is intended solely to illustrate features of the satellite 10 necessary to an understanding of the present embodiment of the satellite mesh system described herein. Those skilled in the art will understand that an actual satellite for implementing the present system may have design features not shown in FIG. 3's schematic depiction. For example, good design practice may dictate that the mouths of the antennas be recessed below the surrounding surface of the satellite to reduce the possibility of impact damage by space debris. Or additional protection might be provided by covering each antenna mouth (recessed or not) with a sheet of material transparent to signals transmitted by and received at the satellite. The design and placement of the solar panels 14 shown in FIG. 3 is also highly schematic, and the invention disclosed and claimed herein is not limited to any particular solar panel configuration, placement, or means of deployment.

Figure 4:
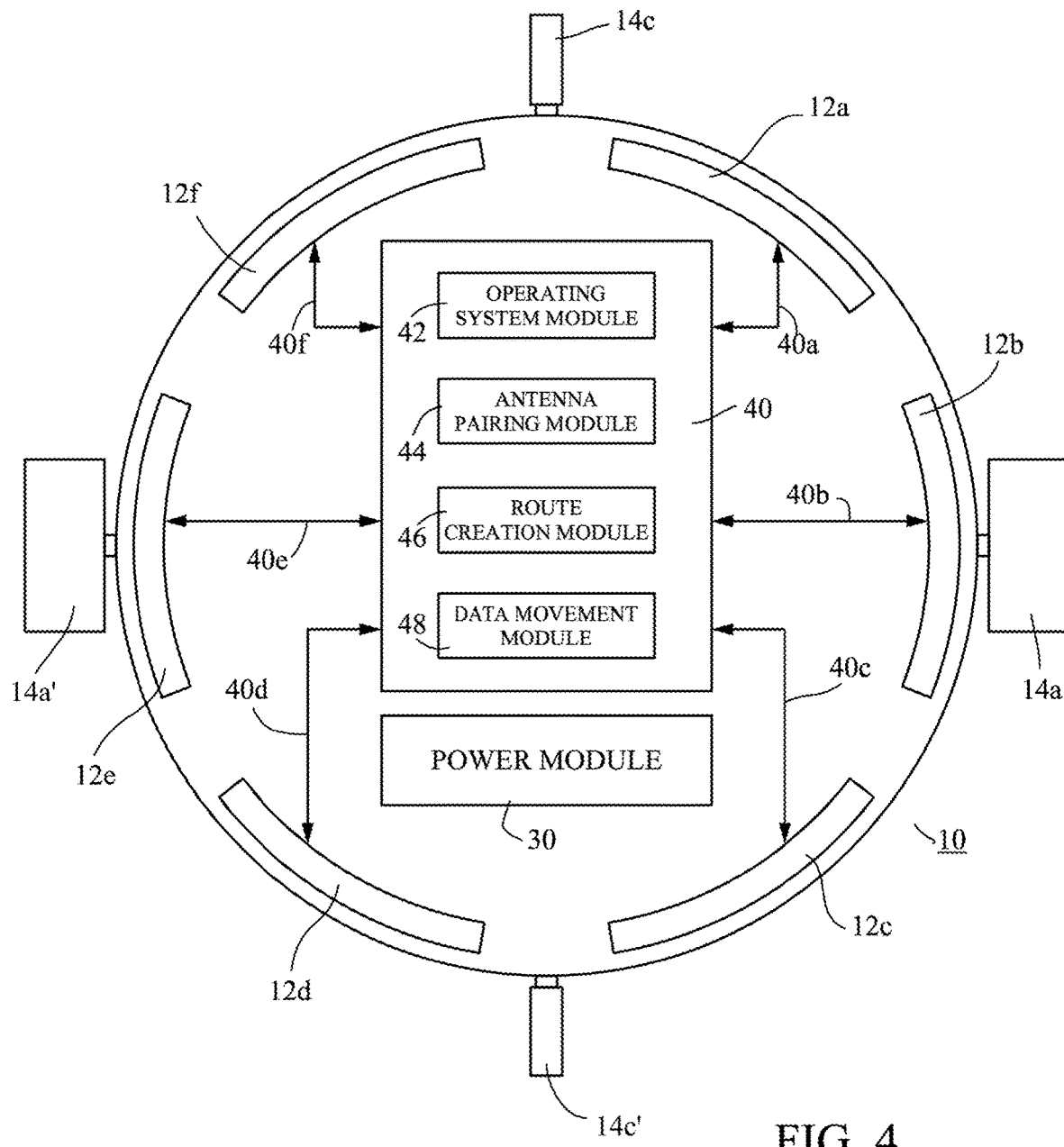
FIG. 4 is a representation of various operational components of the satellite depicted in FIG. 3.

FIG. 4 illustrates schematically various components housed by the satellite 10 (node) for creating a radio route capable of transmitting and receiving radio signals to and from other nodes. As those skilled in the art will readily recognize, in the descriptions of this and other embodiments and aspects of the radio systems comprising the subject matter disclosed and claimed herein, the control circuitry and components described and depicted in the various figures are meant to be exemplary of any electronic computer system capable of performing the functions ascribed to them. Such a computer system will typically include the necessary input/output interface devices and a central processing unit (CPU) with a suitable operating system and application software for executing program instructions. In addition, terms referring to elements of the system, and of the user interfaces described herein, are used herein for simplicity of reference. For example, the terms "component," "module," "system," "apparatus," "interface," or the like are generally intended to refer to a computer-related entity, either hardware, a combination of hardware and software (firmware), software, or software in execution, unless the context clearly indicates otherwise. For example, such a component may be, but is not limited to being, a process running on a processor, a processor, an object, an executable, a thread of execution, a program, and/or a computer. By way of illustration, both an application running on an electronic computing device and the device itself can be a component. One or more components may reside within a process and/or thread of execution and a component may be localized on one computer and/or distributed between two or more computers.

Referring in more detail to FIG. 4, the satellite 10 is depicted in a view in the x-z plane in FIG. 3. It will be appreciated that FIG. 4, like other depictions used herein to describe the subject radio systems and their components, is not to scale. It depicts the solar panels 14a and 14c, as shown in FIG. 3, as well as the diametrically opposed companion solar panels 14a' and 14c' mentioned above. It also schematically depicts a plurality of antenna modules 12a, 12b, 12c, 12d, 12e, and 12f, representing all of the antenna modules onboard the satellite 10, for transmitting and receiving radio signals as discussed above in connection with FIG. 3. This schematic depiction is intended to convey the principle of operation of the present embodiment whereby the plurality of antenna modules in combination will be capable of transmitting and receiving radio signals to and from a node in substantially all radial directions. (However, as already noted, the system described herein can also be implemented with satellites having antenna arrays that transmit with less than full 360° spherical coverage.)

The satellite 10 includes a power module 30 capable of providing a reliable source of electrical power for operating the components of the satellite. The power module 30 includes batteries that are charged by the electricity generated by the solar panels. Suitable power regulating equipment provides steady-state power to the various electronic components carried by the satellite even though the solar panels will spend one half of each satellite orbit out of sight of the sun. In addition to the power module the satellite includes a central processing unit 40 with an operating system module 42 that stores operational software for controlling the various functions of the satellite. As shown in FIG. 4, the CPU 40 is operatively connected to all of the antenna modules 12 via power and data links 40a, 40b, 40c, 40d, 40e, 40f, etc.

FIG. 4 also illustrates four main operational modules under the control of the operating system module. These components are likewise included in ground-station nodes. Each satellite node in a radio route necessarily uses two antenna modules. Since the satellites have no preferred orientation, it is necessary for each satellite (node) to select antenna modules 12 to communicate with another node, either a satellite or a ground station. An antenna pairing module 44 under the control of the operating system uses information messages received from other nodes (ground stations or other satellites) to pair an antenna module in one node for transmitting/receiving signals with an antenna module in another node for receiving/transmitting signals. The radio signals exchanged between nodes are analyzed by a route creation module 46 that uses algorithms discussed further below to create a radio route between two ground stations. (Ground station nodes have corresponding central processing units.) Once a radio route has been established, a data movement module 48 within each node controls the transmission along the radio route of communication signals CS (see FIG. 1). As suggested above, the illustration in FIG. 4 of separate modules for antenna pairing and route creation does not necessarily imply that identifying antenna pairs for transmitting/receiving signals between nodes and selection of potential radio links as a radio route are other than part of a more or less unitary process of creating a preferred radio route for transmitting data communications from one ground station to another.

III. Creating Radio Routes for Data Communications

Launching sufficient numbers of the satellites 10 in random or pseudorandom orbits as discussed above enables implementation of a variety of route creation strategies. This section will discuss two embodiments, and variations thereof, of radio routes created using such a satellite system. One embodiment creates a radio route that comprises radio links between a single satellite and two ground stations. Another embodiment, which allows for communications over longer distances, creates a series of one or more subroutes comprising a first ground station, a first satellite and a second ground station, and another subroute comprising the second ground station, a second satellite, and a third ground station, and if necessary a third subroute comprising the third ground station, a third satellite, and a fourth ground station, and so forth. This radio route would enable communications between a first ground station and an $n^{th}$ ground station using n-1 satellites. Variations on these embodiments are discussed below as well. For example, those skilled in the art will understand that a radio route can also include satellite-to-satellite links if the computers resident in the nodes assemble such a route based on the principles discussed below.

The ability to transmit data between ground stations using radio routes according to this embodiment of the present system is essentially confirmed by the known operational capability of the Motorola-Iridium system, which uses fixed satellites with attitude control. That type of system was able to establish communication links directly between satellites and hand-held units on the ground in spite of the limited antenna power (or gain) available in such units. Thus, an embodiment of the present system that uses antennas with limited power in the satellites in combination with ground stations having more powerful, different type, and/or a greater number of antennas is virtually assured of being able to establish radio routes between two ground stations.

In a basic embodiment, a satellite mesh system according to the present invention uses one of the satellites in accordance with the above description to create a radio route for communications between two ground stations. This route involves two radio links, one between a first ground node and a satellite node, and the other between that satellite node and a second ground node. Although the configuration of a ground station may be different from that of the satellites, conceptually the transmission and reception of radio signals are processed by each essentially the same way. The creation of radio routes may be enhanced by ground station nodes using more and/or more powerful antennas, as well as different antenna types, as compared to those carried by the satellites, since the nodes on the ground do not have the same constraints on weight, power, and space limitations as the satellites. In addition, the ground station antennas can be mounted on tall buildings, towers, high hills, etc., to maximize line-of-sight visibility with the orbiting satellites. In addition, the ground nodes only transmit throughout a hemisphere, rather than in all spherical directions like the satellite nodes, thus reducing the cost of adding antennas for enhanced link creation.

A. Radio Route Creation and Maintenance

The principles underlying creation of radio links in the satellite mesh systems described herein will first be described by using a paradigm in which all transceivers, both satellites and ground stations, are considered to be nodes in the mesh. This will enable an understanding of how a radio route is created with more than one node-to-node link (that is, with at least three nodes). Creation of a radio link between satellites or a radio link between a satellite and a ground station is in most relevant respects the same. Identifying and optimum radio links and routes between pairs of nodes is in some ways analogous to the manner in which routes are created in the ground-based system described in the inventor's U.S. Pat. Nos. 5,793,842 and 6,459,899. The description of link selection and route creation in those patents is incorporated herein by reference for background information regarding optimum or preferred route creation by the nodes in a radio mesh.

An important difference, though, is that the present system, unlike those known in the prior art, creates routes using nodes the positions and orientations of some of which (the satellites) change over time. Accordingly, while prior fixed-node systems might occasionally have to change a radio route for reasons discussed above in connection with FIG. 1, they did not involve a dynamic environment with moving and tumbling nodes that required the system to be capable of automatically and dynamically updating the selection of transmitting/receiving antenna pairs in the nodes as they move relative to each other and change attitude. For example, Motorola-Iridium systems used satellites with fixed attitudes and known relative positions, thus making possible optimum route creation in a manner known for ground-based systems (although the Motorola-Iridium system is not known to use the nodes themselves to create radio routes).

Figure 5:
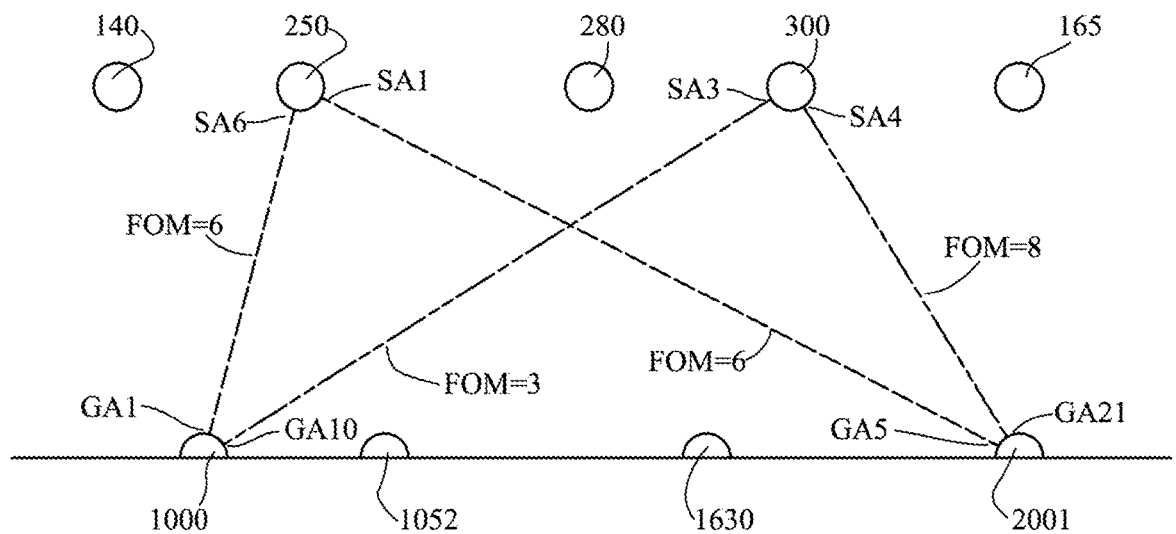
FIG. 5 illustrates an embodiment of a process using a single satellite for creating a radio route between two ground stations.

As just indicated, the present system and method for creating a radio route with robust radio links between nodes involves selecting pairs of antennas and estimating the "quality" of each link by criteria discussed below. An explanatory example will be described in connection with FIG. 5, which shows a plurality of satellites with addresses no. 140, no. 250, no. 280, no. 300, and no. 165, which can form radio links with ground stations with addresses no. 1000, no. 1052, no. 1630, and no. 2001. The following explains how the just the nodes in the system determine a preferred radio route for data communications (calls) from ground node no. 2001 to ground node no. 1000 by choosing between two potential routes, one via satellite no. 250 and the other between satellite no. 300. In a typical system there will be about 200 satellites. The number of ground stations can vary, of course, but FIG. 5 illustrates a few such ground stations over a wide area about, say, 700 miles in diameter.

The link selection process is begun by transmitting from each ground node a routing signal in the form of an initial information signal comprising an identifying packet with the initial information. The antenna modules in every node, both satellite nodes and ground nodes, are each given an identifying number. In addition, each node is identified as either a ground node, sometimes referred to as type A, or a satellite node, sometimes referred to as type B. This node identifying data will typically be contained in a packet header, and the identifying packet will include a payload comprising an initial sample data stream. The following Table 1 is an example of digital first information signals transmitted from two of the antenna modules in a first sending ground node, say the node assigned address "1000."

TABLE 1

| Packet No. 1 | |
| --- | --- |
| Node address no. | 1000 |
| Node type: | A |
| Node antenna no. | GA1 |
| Link count: | 1 |
| Sample data (payload) | XX . . . XX |
| Packet No. 2 | |
| Node address no. | 1000 |
| Node type: | A |
| Node antenna no. | GA4 |
| Link count: | 1 |
| Sample data (payload) | XX . . . XX |

Similar packets will be transmitted continuously from all of the antennas in all of the ground nodes. These signals will be received by a number of other nodes, both ground stations and satellites, but the antenna pairing modules in the nodes will reject information signals sent from the same node type. The satellites also store the number of links back to the sending ground node. In this case, the link count is one.

The initial sample data stream will typically be a known sequence of bits used to evaluate the quality of a potential radio link between two nodes in a manner described just below. It is anticipated that the antennas in each node can transmit the information signals at random intervals without encountering interference with information signals transmitted from other nodes. This is because the number of nodes, and the number of antennas in a given node, that will receive signals from other nodes will likely be small. Alternatively, the antenna modules in the nodes can transmit information signals in preassigned time slots to minimize even further the possibility that an information signal transmitted from one node will arrive at a given antenna in another node at precisely the same time that the given antenna is transmitting its information signal.

Continuing with this example, the second step in the process involves an evaluation by all of the satellite nodes that receive initial information signals from the ground nodes. The process involves a plurality of operations carried out in the satellite antenna pairing and route creation modules. The antenna pairing modules in the receiving satellites store the antenna on which it received the initial information signal. In the FIG. 5 example, satellite no. 250 stores satellite antenna SA6 associated with ground node address no. 1000, and satellite no. 300 stores satellite antenna no. SA3 associated with ground node address no. 1000. The route creation circuitry determines a figure of merit of the received initial information signal that reflects a quality of the signal transmitted over that pair of antennas in the respective ground station and satellite. The figure of merit results from an analysis of certain parameters according to algorithms in the nodes, its purpose being to assign a quantitative value for ranking the suitability of particular antennas in the two nodes as a radio link in the radio route to be created between an originating ground station and a destination ground station. That is, this step in the process involves ranking the quality of a potential radio link between a ground station sending an initial information signal and a satellite receiving it. Examples of properties of received signals that can be used to derive a figure of merit (signal quality) are one or more of signal strength, the error rate in the data stream, and signal-to-noise ratio. In this example, the figure of merit ranges from one (worst quality) to 10 (best quality).

The next step is for the route creation circuitry in all of the satellites to send routing signals in the form of linking information signals from all of their antennas. To illustrate, assume that satellite with address no. 250 receives an initial information signal from sending ground node no. 1000. Table 2 shows the linking information sent in packet form from every antenna in node no. 250 vis-à-vis a potential link with sending ground node no. 1000:

TABLE 2

| Transmitting from: | Node No. 250 |
| --- | --- |
| Node type: | B |
| Node transmitting antenna no. | SA1 |
| Node receiving antenna no. | SA6 |
| Linking node address no. | 1000 |
| Linking node antenna no. | GA1 |
| Link count: | 2 |
| Link figure of merit (FOM) | 6 of 10 |
| Sample data (payload) | XX . . . XX |

Table 3 shows the linking information sent in packet form from every antenna in node no. 300 vis-à-vis a potential link with sending ground node no. 1000:

TABLE 3

| Transmitting from: | Node No. 300 |
| --- | --- |
| Node type: | B |
| Node transmitting antenna no. | SA4 |
| Node receiving antenna no. | SA3 |
| Linking node address no. | 1000 |
| Linking node antenna no. | GA10 |
| Link count: | 2 |
| Link figure of merit (FOM) | 3 of 10 |
| Sample data (payload) | XX . . . XX |

The linking signals will not be accepted at other satellites, which are the same type (type B) as the satellites no. 250 and no. 300 sending the linking message. In addition, the ground nodes will be programmed likewise to reject linking signals with a linking node address the same as the receiving ground station, Note also that the link count from Table 1 is incremented by one by the satellites, reflecting the number of links (two) to the sending ground node no. 1000.

The antenna pairing circuitry in a receiving ground station that receives a linking signal stores at least the satellite node addresses from which the linking signals were transmitted, as well as the antenna on which the linking signals were received at the receiving ground node. In FIG. 5, the ground station no. 2001 stores satellite address no. 250 associated with antenna no. GA5, and satellite address no. 300 associated with antenna no. GA21. The receiving ground node also determines respective figures of merit for potential links between itself and satellite no. 250 and between itself and satellite no. 300. In this example, the FOM=6 for a potential link between ground station No. 2001 and satellite no. 250 and FOM=8 for a potential link between ground station No. 2001 and satellite no. 300.

A preferred radio route between from the receiving ground station to the sending ground station is then determined based on the figures of merit of the available potential links. In the example shown in FIG. 5, the total figure of merit for the radio route via satellite no. 250 is 12 (6+6) and the total figure of merit for the radio route via satellite no. 300 is 11 (3+8). Therefore, the preferred radio route is via satellite no. 250. Note that it is the quality of the overall route that determines the choice, not the quality of an individual link. As described in more detail below, a data transmission destined for the sending ground station no. 1000 includes the destination address (node no. 1000). The receiving ground station no. 2001 knows that the first radio link in the route to destination node no. 1000 is satellite no. 250 and that a transmission on antenna no. GA5 of ground station no. 2001 will be received at satellite no. 250. (Optionally, the satellite no. 250 can confirm that the transmission is from ground node no. 2001 if the transmission is received on satellite antenna no. SA1.) Satellite no. 250 has stored antenna no. SA6 as the antenna to use for data transmissions to ground station no. 1000. (Optionally, the ground station no. 1000 can confirm that the transmission is from satellite no. 250 if the transmission is received on ground station antenna no. GAL) Thus, the selected antennas at the ground stations and the satellite (the nodes) direct transmission signals from an originating node to a satellite and then to a destination node without requiring that the entire route being stored at any one node or central location and without requiring a central computer to determine a preferred route. From this example, one skilled in the art will understand how radio routes are constructed for data communications from any of multiple receiving (destination) ground stations to any of multiple sending (originating) ground stations.

It will also be understood that the satellites no. 140, no. 280, no. 165, etc., may also receive initial information signals from the ground station no. 1000 and send linking signals that are received by ground stations no. 1052, no. 1052, no. 1630, and no. 2001. Likewise, all of the satellites shown in FIG. 5 and any others within radio range (see FIG. 2) may receive initial information signals from all of the ground stations no. 1052, no. 1630, and no. 2001, and any others within radio range. However, the determination of a preferred route between any two ground stations proceeds according to the above discussion, in which the combined figure of merit of both potential links in a radio route between the ground stations is evaluated by the receiving ground node of a potential radio routes.

The above steps are continuously repeated at predetermined intervals, including during the transmission of packets of communication signals over a radio route. Thus, as the satellites move and change orientation, the modules in the nodes can continuously update the evaluation of the radio links between nodes, and can change the preferred radio route between originating and destination nodes. This is facilitated by the fact that each node actually only communicates with a limited number of other nodes and thus only a limited number of links has to be updated with each iteration of the link creation process. The frequency of the link refreshing process will depend on various factors, but it is believed that frequencies between 0.5 and 20 Hz will be adequate in a typical system. As already noted, the link selection and maintenance procedure is performed by computations solely using the onboard calculating capacity of the nodes as described herein.

It should be also noted that one node might receive a signal from another node on more than one antenna, depending on the properties of the antenna modules, such as their HPBW. However, the route creation process is the same as described above in that instance. It will also be appreciated that many different criteria can be used to evaluate the quality of the potential link between the nodes. Typical ones would be direct indications of link quality such as the strength of the received signal and the error rate estimate. However, other criteria can be used as well. For example, the amount of remaining battery life in each of the nodes in the potential link could be determined and the quality rating (figure of merit) adjusted to account for how long a satellite has been exposed to the sun as an indication that battery power might only remain strong enough to support a link for a short time. Another criterion could be link loading, which refers to the number of potential radio links with other nodes that is stored at a particular node. Each node in the system (ground stations and satellites) can eliminate potential links with a quality below a predetermined threshold (say FOM=2). This will prevent a route from being formed using one very high quality link and one very low quality link, the latter of which may disrupt data communications even though the overall quality of the route appears to be satisfactory. It may also reduce the time required to determine a preferred a radio route by eliminating a number of transmissions between the nodes.

B. Transmitting Data Communications Over the Radio Route

As just explained, once a plurality of links is assembled into a radio route, it can be used to transmit communication signals from an originating node to a destination node. However, one issue that must be addressed when communicating data transmissions over the radio route is that a single antenna in a node cannot both transmit and receive signals simultaneously. This issue is addressed in a variety of ways in the '842 and '899 patents. One that is particularly adapted to the present system is the designation of the nodes as one of two types, called "A" and "B" in this description (or "odd" and "even" in the '842 and '899 patents). In such an arrangement signals transmitted from one type of node are separated in some fashion from signals transmitted from the other type of node so that a node can receive signals on the same antenna that it uses for transmitting signals.

One way of doing this is for one type of node to transmit in certain frequency bands and the other type to transmit in different frequency bands. In this arrangement an antenna in a node can transmit and receive signals at the same time. One drawback is the necessity of providing sufficient separation between the respective frequency bands to ensure that the there is no interference when an antenna is transmitting and receiving at the same time. Another way of separating signal transmission and reception is to transmit from one type of node in a particular time slot and from the other type of node in a different time slot interleaved with the first time slot.

Data/communication signal transmission in accordance with this description is controlled by the data movement modules 48 in the satellites 10. For example, a data communication comprising packets of data with a header and a payload will be received at an originating ground station. The header will typically include address information, including identification of the destination ground station. The data transmission module unpacks the address information and indicates the system address (node number) of the destination node. The packets will then be sent to the destination ground station over the radio route established in the manner described above. An important aspect of the present system is that the preferred radio routes are subject to change even during an ongoing data transmission. However, the data packets arriving at the destination ground station can be unpacked, undergo error correction, and be reassembled in the proper order in accordance with known principles, even if the packets arrive out of order because they traveled via different routes or were delayed while a different route was being created.

C. Summary

It will be apparent to those skilled in the art that the present system is not simply a superposition of the route creation techniques described in the '842 and '899 patents on a three-dimensional mesh in which the nodes include satellites instead of fixed devices in an essentially two-dimensional space. There are numerous factors that go into link selection and route creation, some of which are discussed above, that must be accounted for in the type of space-based, three-dimensional mesh described herein. For example, since the satellites have different trajectories, some of which will pass over large expanses of unpopulated oceans, while others will pass over land masses that will generate more data transmissions, battery life can vary greatly from satellite to satellite. Accordingly, the amount battery charge remaining can be an important parameter in selecting a satellite as a node in a radio route.

The use of a single satellite to establish an optimum or preferred radio route has several advantages. One is that it identifies a preferred route virtually instantaneously because the radio signals passed between the satellites and the ground stations include information that is used by algorithms stored at the ground stations and in the satellites to calculate a preferred radio route in small fractions of a second. Thus, as soon as a ground station transmits a signal indicating that a route is needed to another ground station, the route can be established immediately and used for transmitting communication signals. This type of three-node route can "refresh" sufficiently rapidly to minimize disruptions of data transmissions so that if at a later time a different satellite, or different antennas on the same satellite, would provide a better quality route, the route configuration can be adjusted nearly instantaneously to provide better quality links and minimize delays in data transmission. It also allows for changing the satellite used in the route for other reasons, an example being waning battery life.

Those skilled in the art will understand that engineering a system in accordance with the above description will require trade-offs among different aspects of the system. Thus, an actual system will likely involve many competing considerations in optimizing a particular design. Some of these considerations are the number of satellites, satellite altitude, the number of antennas, particularly in the satellites, the beam width of the antennas, the size of the satellites, the cycle time for updating route creation, just to name a few.

An aspect of the present embodiment is that the probability of there being at least one satellite present to establish a ground-to-satellite-to-ground radio route can be readily increased by simply placing more satellites in orbit, in accordance with the description above. Since the satellites are very light and inexpensive, increasing their number is an economically feasible way of increasing the reliability of the system. Although there may be periods when there is no satellite immediately available for the establishment of a radio route between two ground stations, the rapid rate at which the system can refresh itself increases the probability that at least one satellite will soon (likely within a few seconds) become available. In most applications, a time lag with a duration of this order of magnitude will be acceptable. For those reasons, a particularly useful application of the present embodiment is providing reliable radio routes over particular geographic areas.

The system described herein also enables use of the randomly orbiting satellites to create a ground-to-single-satellite radio route over which signals can be transmitted and received only over a predetermined geographical area. The inventor's U.S. application Ser. No. 15/656,111, filed Jul. 21, 2017, describes such a system employed to provide radio routes throughout Egypt. The system is also is readily adapted to settings where ground nodes are too far apart, or where topographical features will severely limit the number of satellites visible to both ground nodes. In that case one or more intermediate ground nodes are provided between the distant locations to create multiple single-satellite radio routes. Such a system used to provide coverage of the entire Russian Federation. These and still further embodiments and aspects of the invention are described in U.S. application Ser. No. 15/656,111, and in the inventor's U.S. provisional applications nos. 62/379,601, filed Aug. 25, 2016, and 62/396,181, filed Sep. 18, 2016, the contents of all three of which are incorporated herein by reference as if set out in full.

IV. Rotating Satellites

As already discussed, designing a satellite-based radio mesh system in accordance with the above description involves myriad trade-offs among a wide variety of parameters. Two particular parameters that work at cross purposes, and thus require judicious selection, are the beam widths of routing signals and calls transmitted by the antennas in the nodes and the power (gain) of the antennas. On the one hand, greater beam width will increase the probability that a beam match can be created, but a greater beam width reduces the gain of the antenna. Conversely, a narrower beam will increase antenna gain, but reduce the probability of creating a beam match between nodes. This trade-off is particularly significant in the satellite nodes because the satellite antenna configuration has to take into consideration constraints on the weight and size of the satellites, which limits the number of antennas the satellite can carry, and on the electrical power available from onboard batteries. It is also desirable to increase the number of possible beam matches between nodes because some radio beams may be weakened by grazing the earth's surface, which can partially block the signal before it reaches a receiving node.

Achieving the proper trade-off between beam width and antenna gain is important to the efficient functioning of a random-orbit satellite system. Such a system relies on the statistical probability that routes can be created using randomly orbiting satellites to create and select routes. A basic system that is simple and inexpensive to implement, and is especially effective in creating single satellite radio routes, uses tumbling satellites as discussed above. As already described, the satellites' antennas point out into space—towards each other and the earth—to enable the establishment of links between nodes. A fundamental property of the system is its dependence on routing signals and data transmissions of sufficient strength reaching other nodes (ground stations and satellites). The system relies on having enough satellites in orbit and making the proper design trade-offs, including beam width vs. gain, to enhance the probability that a suitable route can be created between two ground stations via one or more satellites. However, there may be system installations in which better data transmission could be achieved by a multiple satellite route if the probability of creating high quality (figure of merit) links between satellites is increased.

The present embodiment utilizes satellites that rotate about an axis, which, as explained herein, increases the likelihood that a route with high quality links and sub routes can be created using one or more satellites. As explained below, employing rotating satellites enables beam width to be reduced, with a corresponding increase in gain, thereby resulting in higher quality radio links between nodes.

A. Principles Underlying the Present Embodiment

In the tumbling satellite embodiment discussed above, an exemplary satellite configuration uses 25 antennas covering about 60% of the surface of a spherical satellite. Thus, a rough estimate of the probability of a radio beam transmitted by such a satellite being received by another like satellite would be about 36% (0.6×0.6). It will be appreciated by those skilled in the art that this is only an estimate, since the radio beams will have side lobes that will increase the probability that a link will be created to a certain extent. If the diameter of the satellite is doubled, the diameter d of the parabolic dish antennas used in the above-described example can also be doubled. By above equation (1), $\alpha=(k \times \gamma)/d$, the HPBW will be halved, to about 18°, from the value of the antenna example given above. While the area of the beam will be only ¼ as large, the antenna gain will be increased by a factor of four, or about 6 dB. On the other hand, the probability of a radio beam transmitted from one tumbling satellite being received by another is reduced to about 2% ($36\% \times (¼)^2$).

As discussed above in the tumbling satellite embodiment, repeated radio signals sent by nodes in the system include information on links and sub routes that need only include the address of a final ground destination and a figure of merit to that destination. The rotating satellite embodiment takes the tumbling satellite embodiment as a point a departure toward a technique for increasing the likelihood of creating a radio link, especially between satellites with high-gain, narrow-beam antennas. It will be appreciated, particularly from the discussion that follows, that a particular radio route in a spinning satellite system may not last as long as in a tumbling satellite system. Accordingly, one way to enhance the route creation process would be to use route creating signals that have a smaller amount of sample digital data (see Tables 1-3, above) to enable them to be transmitted in a shorter period of time to effect more rapid route creation.

As also discussed above, data transmissions ("calls") will typically be in the form of packets with a header, which includes address data indicating the packet destination, and a payload comprising the content of the transmission. Header information in multiple packets can be used to arrange the packets in the same order in which they were transmitted. Although a particular radio route in a rotating satellite system may not last as long as in a tumbling satellite system, the data transmission packet headers will include information on the proper order of the packets for use by the destination ground station to reassemble the transmission. Thus, while there may be delays in completing a particular data transmission while a new radio route is created in mid-transmission, that potential drawback will be offset by the fact that the higher gain radio beams made feasible by using rotating satellites will be more likely to establish radio routes by which data transmissions between certain ground stations can be made in the first place.

B. Linking Satellites to Satellites

The discussion further above of the tumbling satellite embodiment points out that the establishment of radio links between ground stations and satellites can be enhanced by increasing the number and gain of ground station antennas. This is feasible in most installations because ground stations typically do not have the constraints on weight, available space, and electrical power that exist with the satellites. In the present embodiment the establishment of radio links by beam matching between satellites is enhanced by using satellites that are deployed into orbit deliberately spinning about a rotational axis. In one embodiment, the satellites themselves have the same components as the satellite depicted in FIGS. 3 and 4 and described in the text above associated with them.

The angular velocity of the satellites will be relatively high. For purposes of illustrating the operation of a typical system using rotating satellites, it will be assumed that the satellites are deployed with an angular velocity $\omega=2\pi$ rad/sec (60 rpm). Those skilled in the art will understand that this example is not meant to be limiting and that it is within the scope of this disclosure to employ any angular velocity effective to establish radio routes as described and claimed herein. The orientation of the axis of rotation will not be controlled, but principles of physics dictate that each satellite will assume an axis of rotation through its center of mass and the axis of rotation will precess around the angular velocity $\omega$. However, the orientation of the axis of rotation at any given time does not affect the creation of radio links, as will be apparent from the discussion that follows.

Rotating satellites increase the probability of a transmitted radio beam being received by another satellite because the satellite antennas "sweep" an area as the satellite rotates. This can be understood by considering the satellite $S_1$ shown in FIG. 6A, which is schematic cross-section through the satellite "equator," corresponding to the equator 16 of the satellite 10 in FIG. 3. In this example, the satellite $S_1$ comprises five antennas $12_1$, $12_2$, $12_3$, $12_4$, and $12_5$, each having an HPBW of 35°, arranged equally around its equator 16 and rotating about the z-axis at an angular velocity $\omega$. A location RL remote from the satellite and lying in the plane of the equator will "see" five antennas as the satellite rotates through one complete revolution. It will be understood that this number will be different for locations not in the equatorial plane, but the principle still holds. It will also be appreciated that the number may increase or decrease because of precession about the rotational axis, but most locations remote from the satellite (including ground stations) will still see plural antennas as the satellite rotates. Thus, a second satellite with its equatorial plane in the equatorial plane of the first satellite $S_1$, the probability of being able to create a radio link with a 6 dB gain increase over the tumbling satellite example above is about 10% (5 antennas×2% for each antenna). The probability of creating a beam match with a ground station antenna is likewise increased.

It will be understood that this is a highly idealized representation, which ignores factors such as precession of the satellites around their axes of rotation, but it nevertheless illustrates the concept that rotating satellites present an increased probability for the creation of beam matches between two satellites. Nevertheless, considering the large number of randomly orbiting satellites available for route creation, the increased probability of beam matches using rotating satellites will in many, if not most, cases be sufficient to enable assembly of a radio route with higher quality links between two ground stations via multiple satellites. While this will have special applicability in reaching ground stations separated by large distances, it also can increase the reliability of radio routes between ground stations in other settings.

1. Counter-Rotating Satellites

Figure 6A:
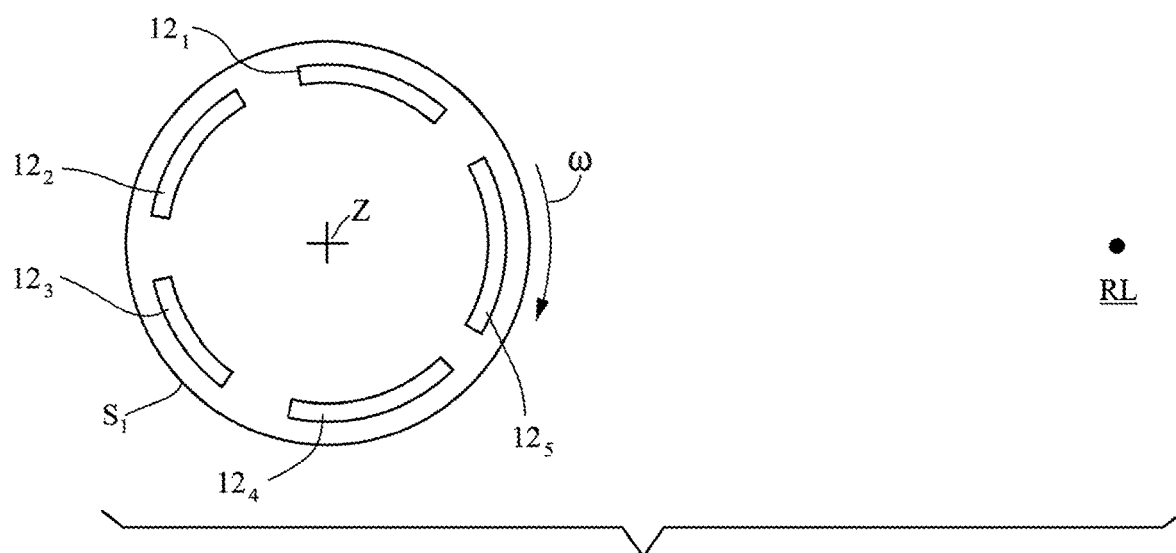
FIG. 6, comprising FIGS. 6A, 6B, and 6C, schematically depicts rotating satellites in accordance with an alternate embodiment of a system using satellites in random orbits
Figure 6B:
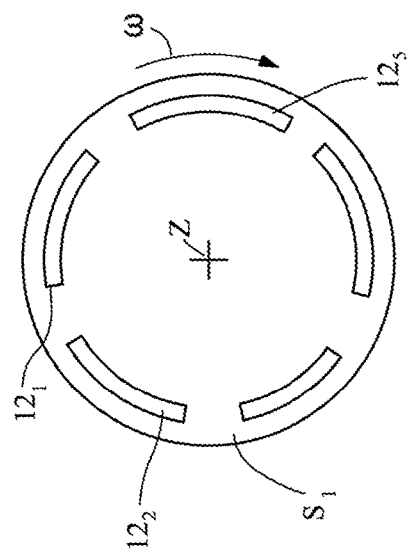
Figure 6B:
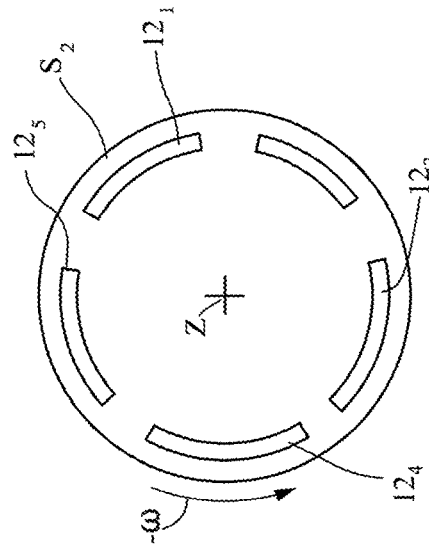

The satellites are preferably deployed with about half of them rotating in a first direction about their rotational axis and the other half rotating in the opposite direction. FIG. 6B, which uses like numerals for like parts in FIG. 6A, illustrates this principle by showing the satellite $S_1$ rotating at an angular velocity $\omega$ in a first direction and a second satellite $S_2$ rotating at the same angular velocity $-\omega$ (in the opposite rotational direction). This illustrates how a beam match between antenna $12_5$ in satellite $S_1$ and antenna $12_4$ in satellite $S_2$ will be sustained longer than if the two satellites were rotating in the same direction. That is, if the satellites are rotating in opposite directions, facing antennas on the satellites are traveling at essentially the same linear velocity relative to each other. On the other hand, if the satellites are rotating in the same direction, their relative linear velocity is twice the linear velocity of each. With a sufficient number of satellites in orbit (200 in the previous embodiment), it is believed that there is a significant probability of having a plurality of counter-rotating satellites over any given geographic area for which a radio route is being established. Thus, the likelihood of quickly establishing a relatively long-lasting radio route is increased by deploying at least some, and preferably about one-half, of the satellites rotating in the opposite direction from the others. In addition, not only are two antennas on respective satellites in alignment longer, but as soon as they rotate out of view of each other, two other antennas of the satellites may align, thus enabling rapid refreshing of the radio link between the satellites. In the example illustrated in FIG. 6B, antenna $12_1$ in satellite $S_1$ and antenna $12_5$ in satellite $S_2$ will align next.

Like the example used to illustrate the increased efficacy of using rotating satellites discussed just above, this is also an idealized description of how counter-rotating satellites can create longer lasting radio links between them. In addition, to the assumptions underlying the above description, there may not be at any given time two counter-rotating satellites over an area where a radio route is desired between two ground stations. Nevertheless, taken together, these examples illustrate the point that rotating satellites, and particularly counter-rotating satellites, will provide a sufficient probability of establishing a relatively high gain radio link between the random orbit satellites to enable reliable data communications between two ground stations via one or more satellites. And because the antennas point in a plurality of directions (preferably over the entire spherical space surrounding the satellite), the opportunity for establishing a radio link between two spinning satellites will in most instances be enhanced by using rotating satellites.

2. Satellites with Different Angular Velocities

Figure 6C:
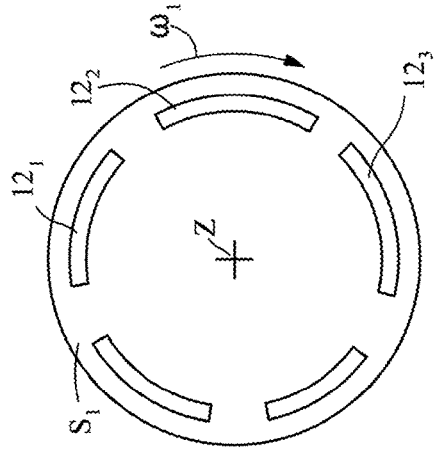
Figure 6C:
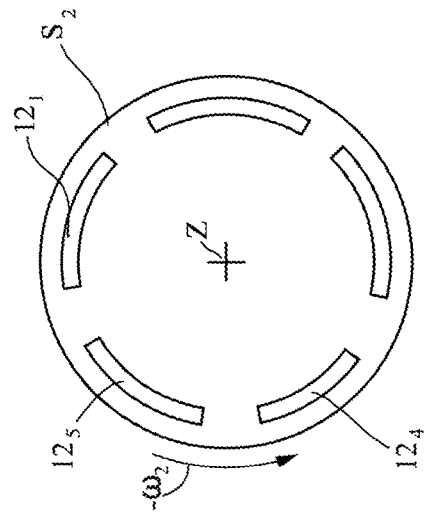

A variation of the embodiment described just above employs satellites that rotate at different angular velocities. This variation is depicted schematically in FIG. 6C, in which the satellite $S_1$ rotates at an angular velocity $\omega_1$ and $S_2$ rotates at a different angular velocity $\omega_2$. The advantage of this system is that the antennas on the counter-rotating satellites may be out of phase in the sense that antenna on one satellite may be pointing directly to a space between antennas on a second satellite, as depicted in FIG. 6C. If the satellites are rotating at the same angular velocity, this situation can persist for an extended period of time, thus weakening a radio link between the satellites, or perhaps preventing the establishment of a link altogether. Rotating the satellites at different angular velocities will increase the likelihood that at some angular position antennas on both satellites will face each other (be in phase), thus enabling the establishment of a useful radio link between them. For example, in the case illustrated in FIG. 6C, the antennas on the satellites are exactly 180° out of phase, in that the antenna $12_2$ on satellite $S_1$ is pointing directly at the space between the antennas $12_4$ and $12_5$ on satellite $S_2$. If $\omega_1 = 1.33 \times \omega_2$, the antenna $12_5$ on satellite $S_2$ and the antenna $12_5$ on satellite $S_2$ will line up as the satellites rotate.

It is anticipated that certain installations of the system will utilize numerous satellite to satellite links, while at the same time being able to tolerate some delays transmitting calls between ground stations. This type of installation can benefit from using satellites that rotate at slightly different angular velocities. In other words, the system would be designed to increase the probability that a satellite transmitting a radio signal would rotate at a different angular velocity than a satellite receiving the signal. The data communications might be delayed while the radio route is intermittently disrupted and refreshed as different antennas on the two satellites disalign and realign. However, this can be compensated for by buffering the data communications and sending them each interval when the radio link is present.

In an exemplary approach, the cohort of satellites could be divided into five groups with different angular velocities in accordance with the following table.

TABLE 4

| | |
|---|---|
| Very slow spinner: | 0.68 revolutions per second |
| Slow spinner: | 0.84 revolutions per second |
| Average spinner: | 1.0 revolution per second |
| Fast spinner: | 1.16 revolutions per second |
| Very fast spinner: | 1.32 revolutions per second |

The discussion immediately above explains how this can tend to increase the probability of establishing beam matches between the antennas on respective satellites. That is, the above discussion demonstrated one instance of how a satellite rotating at an angular velocity 1.33 times the angular velocity of another can facilitate a beam match. The same principle applies for other multiples of angular velocity.

By the same token, this system implementation will also make more beam matches possible in a given time period because the antennas on one satellite will have more opportunities to line up sufficiently with antennas on another satellite to form beam matches if the satellites are counter-rotating at different angular velocities. There may be no beam matches between two satellites at a given time, or for a certain interval, as they rotate. However, as they continue to rotate at different angular velocities, antennas on the satellites will likely form beam matches because antennas on the respective satellites will be likely to line up at some point. This may take plural revolutions of the satellites, but rotation at different angular velocities greatly increases the probability that many more matches will be created as the satellites continue to rotate. It will thus be appreciated from the complex interrelationship of the antennas on different satellites as the satellites move in their orbits and rotate about their axes that providing plural cohorts of satellites rotating at respective different angular velocities will increase the probably of creating more beam matches between pairs of the satellites during any given time interval. Any resulting delays while beam matches are created may be tolerable if the alternative is an inability of a particular ground station to send and receive data transmissions at all.

3. Other Considerations

It is known that the angular velocity of a body rotating in earth orbit, especially at lower altitudes, is subject to decay from a number of factors. For example, even though the earth's atmosphere is extremely thin at low-earth orbital altitudes, the region in which satellites used in the present system will preferably occupy, orbiting objects nevertheless still experience aerodynamic drag. Forces generated by the passage through the earth's magnetic field of ferromagnetic materials in the object can also affect the angular velocity of a rotating body such as a satellite. The tendency of the rotating satellites to undergo a reduction in angular velocity over time can be compensated for in a variety of ways. One is to use retro rockets or active mechanical devices known in the prior art. However, since one of the objects of the invention is to minimize the cost of building, deploying, and maintaining the satellites used in the radio systems described herein, it is preferred to use passive means for compensating for external forces on the satellites or for creating forces to control satellite movements.

One such means uses solar panels with solar cells only on one side to utilize the momentum of photons striking the panels to create a torque about the rotational axis of the satellite. For example, referring to FIGS. 3 and 4, for a satellite that is deployed to rotate counterclockwise about the z-axis (as viewed in the negative-z direction), each solar panel 14*a* would have solar cells only on one side, namely the side facing the viewer for the solar panel 14*a* to the right in FIG. 4 and the side facing away from the viewer for the other solar panel 14*a* to the left in FIG. 4. The remaining solar panels would still have solar cells on both sides. Although larger solar panels will increase aerodynamic drag on the satellite, it is believed that it will be possible through judicious design to provide solar panels of a size, configuration, and orientation that will generate a net torque on the satellite that overcomes the tendency of the angular velocity to decay.

It is likewise believed possible to selectively distribute the mass of the satellite components to cause it to rotate about a particular axis. Since it is anticipated that the battery will form a large proportion of the satellite mass, it will preferably be located at the center of mass of the satellite and have a mass distribution that is symmetric about the axis of rotation. In addition, the effects of the earth's magnetic field on the satellites can be minimized by using non-ferromagnetic materials such as aluminum wherever possible. These features, in addition to the use of the solar panels to provide a moment about the rotational axis, will suffice to at least reduce the rate of decay of the satellites' angular velocity.

As mentioned above, some or all of the above passive means for controlling satellite movement can be employed in the tumbling satellite embodiment. That is, in one variation one or more solar panels can have solar cells on only one side to impart an unbalanced moment on the satellite to cause it to continue to tumble. Another variation could locate ferromagnetic materials in selected locations on the satellite that will produce forces that vary in magnitude and direction as the satellite traverses the earth's magnetic field.

Since satellites originally deployed to rotate will likely remain in orbit even if their initial angular velocity decays over time, they will still be available as nodes in a radio route between ground stations. Since satellites in accordance with the present system are inexpensive to construct, launch, and deploy, additional rotating satellites can be launched to replace any whose angular velocity has decayed. This will not only increase the number of satellites available for route creation, but to the extent that any of the older satellites remain spinning, the effect will be to automatically take advantage of the improved performance made capable by using satellites rotating at different angular velocities.

V. High-Gain Directional Antennas for Three-Dimensional Radio Mesh Systems

As discussed above, an important factor in establishing beam matches with satellites is the width of the radio beam transmitted from a satellite and received by another node (satellite or ground station). Rotating satellites would increase to some degree the probability of a beam match with satellites equipped with antennas having narrower beams (lower HPBW) than those discussed above in section IL. However, a trade-off is still required between using antennas with narrower beams and higher gains to increase the quality of radio links between nodes, and using antennas that produce broader beams (higher HPBVV) with lower gains to increase the probability of creating a beam match. The situation is made more complex because the creation of beam matches between system nodes depends on numerous other factors, such as those discussed previously, so that optimizing system performance entails more than just a trade-off among competing antenna configurations. While it will be well within the ability of one skilled in the art to design and implement an operable system in accordance with the above-described embodiments, such systems may prove to have certain performance issues, such as requiring inordinate amounts of time to assemble multiple acceptable radio links into a radio route between ground stations, which in turn may delay call transmissions. While any potential drawbacks may be acceptable in certain settings, such as where transmitting data over long distances would otherwise not be possible, it would be preferable to assemble radio routes so that such delays are minimized or eliminated.

To that end, the present embodiment describes antenna designs and configurations that can further increase the probability of creating satellite-to-satellite and satellite-to-ground station beam matches by using high-gain radio beams that will result in more rapidly creating radio links with figures of merit acceptable for a radio route. It will be appreciated that the same antenna configuration may also make it possible to create a radio link between two ground stations where such a link would not be possible with lower gain, less highly directional antennas. In addition, the antenna designs discussed here can be used in any of the satellite configurations and deployment schemes already discussed (such as rotating and counter-rotating satellites). They can also be used in systems using non-orbital aerial nodes, in direct communications between aerial nodes of different types, and with individual personal devices such as smartphones and Wi-Fi equipped computers, described further below in section VI.

Figure 7:
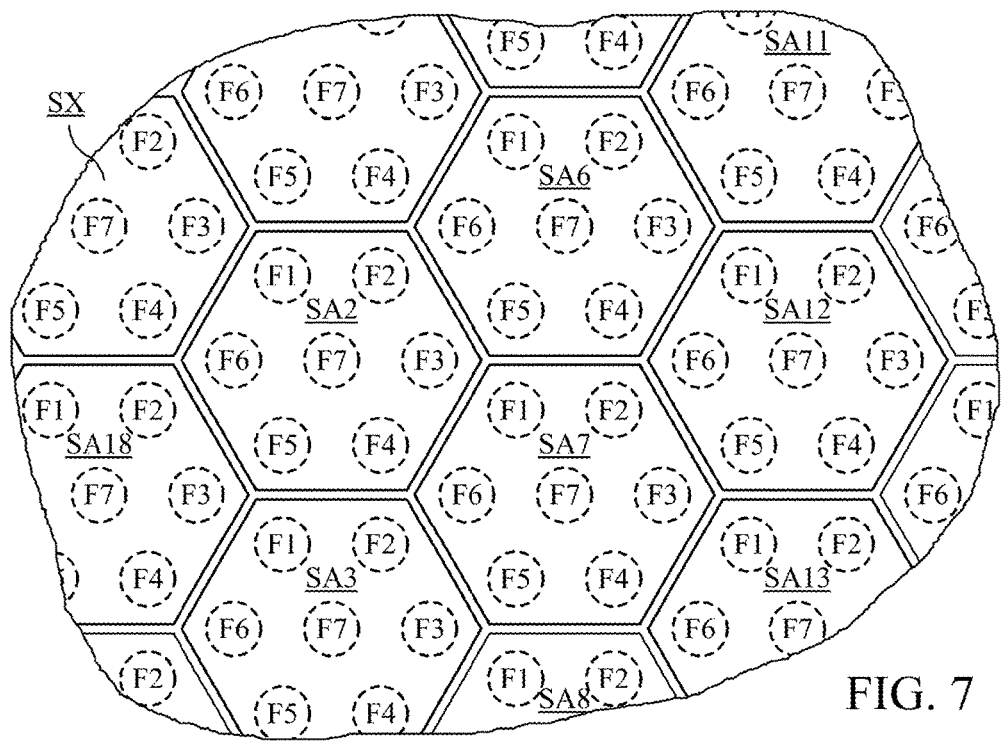
FIG. 7 is a schematic two-dimensional depiction of the surface of a spherical satellite having an antenna configuration in accordance with another embodiment of the system described herein using randomly orbiting satellites without attitude control.

FIG. 7 is a schematic depiction of the surface of a substantially spherical satellite SX that exemplifies the present embodiment. FIG. 7 represents in two dimensions the three-dimensional surface of the satellite, showing an array of satellite antenna modules SA that substantially cover the surface of the satellite. In this implementation, there are 25 antenna modules numbered SA1 to SA25. In the portion of the satellite surface in FIG. 7, the entire antenna opening at the satellite surface is shown for antennas SA2, SA6, SA7, and SA12. The openings of the other antennas are partially shown, some of which are labeled in FIG. 7, such as, SA3, SA8, SA11, SA13, and SA18. It will be understood that this is an idealized representation, intended to indicate that it is preferable to make the satellite as small as possible consistent with the inclusion of the desired number of antennas as well as providing sufficient spacing between antenna openings at appropriate locations to mount solar panels 14 (see FIGS. 3 and 4).

To increase antenna gain, the antenna reflectors in the present embodiment are made as large as possible consistent with the other overall requirements of the system, such as limiting satellite weight and size to minimize launch costs. According to known principles of parabolic antenna design, the reflector should be at least one wavelength in diameter, preferably more. Using the example given above, the antennas transmit (and receive) in the microwave C band at 5 GHz signals. However, to facilitate comparison with the embodiment discussed in section II, take an example in which the antenna reflectors use 24 cm reflectors, which is 1.6 times the size of the reflectors in the section II embodiment. This could result in an increase of as much 250% in gain (which is proportional to the square of the reflector diameter=$1.6^2$), but all things being equal it would reduce HPBW by only about 60% (1/1.6, per equation 1). If the feeds are located four wavelengths from the antenna reflectors, it is believed that a satellite with a diameter of about one meter (or comparable size if the satellite is nonspherical) will be able to meet the operational specifications herein. However, it will be understood that operation of the system does not rely on using a particular antenna design, and those skilled in the art will be able to use known antenna design principles to provide a satellite with the capabilities required by the present embodiment. Nevertheless, antennas with larger reflectors can be used to provide even higher gains, and the satellites can be made correspondingly larger. Moreover, the amount of added weight will for the most part be attributable to the increase in the size of the satellite outer casing and the additional material needed for the additional feeds and larger reflectors (although satellite weight can be reduced if the reflectors have a mesh construction). Accordingly, satellites used in the present embodiment should still be extremely light in comparison to known communications satellites for all of the reasons already discussed above, a principal one among them being that they require no attitude control.

In the present embodiment illustrated in FIG. 7 each of the antennas SA1 to SA25 is a parabolic antenna with seven feeds F1 to F7. The following description uses the notation $FX_{SAX}$ to denote a particular feed of a particular antenna. For example, $F1_{SA3}$ refers to the feed F1 of the antenna SA3, $F5_{SA18}$ refers to the feed F5 of the antenna SA18, and so forth. The feeds F1 to F6 are spaced equidistant from each other and are arranged at a distance from the feed F7 at the antenna focal point, for reasons discussed in more detail below. The shape and curvature of the antenna reflectors can be chosen according to known multi-feed antenna designs and principles of operation. The hexagonal shape of the antenna openings is used in the figure to emphasize that the feeds F2 to F7 are displaced from the reflector focal axis. It will also be appreciated that the antenna reflectors can have non-parabolic topologies, such as spherical, combination spherical/parabolic, and others, to maximize the operational characteristics of the system embodiment described here. Examples of multi-feed reflecting antenna designs that those skilled in the art will be able to adapt for use in the present embodiment are disclosed in U.S. Pat. Nos. 3,815,140, 6,208,312, 6,219,003, and 9,035,839, the disclosures of all of which are incorporated herein by reference as if set out in full. It should be understood that the number of antennas and the number of feeds per antenna depends on the design of the satellites and the desired operational characteristics of the system. More or fewer antennas and feeds may be used within the scope of the present invention.

A. Antenna Control Circuitry

Figure 8:
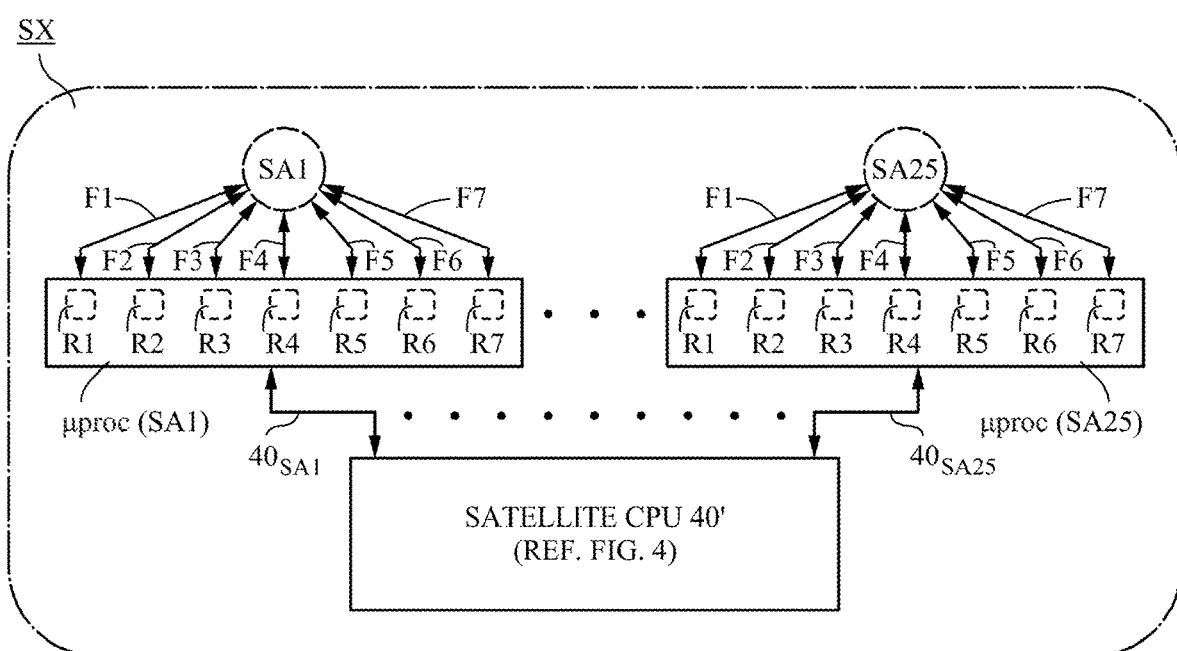
FIG. 8 is a functional diagram of the electronic components of the satellite with the antenna configuration depicted in FIG. 7.

FIG. 8 is a functional block diagram of exemplary computer circuitry for processing routing signals and calls received by the antenna feeds and for assembling linking signals and calls for transmission by the antenna feeds. As with all of the descriptions of computer and processing circuitry previously described, the boxes and the connections between them in FIG. 8 are used solely as an aid in explaining the operation of the present embodiment. It will be well within the skill of the art to design and implement appropriate computer components, including hardware, firmware, and/or software, as required to perform the functions described herein. Moreover, the circuit diagram in FIG. 8 is not meant to suggest any particular architecture for performing the functions to be described.

FIG. 8 depicts just the antenna modules SA1 and SA25 for purposes of the present description; the remaining antenna modules are omitted from the figure for clarity. Each antenna module has associated with it a microprocessor "μproc" for processing signals introduced to the antenna feeds and receiving signals from the antenna feeds. The individual antenna microprocessors are identified in FIG. 8 by the notation μproc (SAX), "X" being the number of the associated antenna module according to the description above of FIG. 7. Thus, in the figure, "μproc (SA25)" denotes the onboard circuitry for processing signals introduced to and received from the feeds F1 to F7 of the antenna module SA1. Likewise, "μproc (SA25)" denotes the onboard circuitry for processing signals introduced to and received from the feeds F1 to F7 of the antenna module SA25. Each of the other antenna modules SA2 to SA24 is associated with its own microprocessor, as represented by the plural dots between μproc (SA1) and μproc (SA25) in FIG. 8. Each microprocessor μproc includes radio transceivers denoted by R1 to R7, indicating that each is associated with a corresponding feed F1 to F7 of that antenna. The transceivers convert RF signals received by the feeds into a data stream and convert a data stream into RF signals to be broadcast by the antenna.

The antenna module microprocessors are connected by power and data lines $40_{SA1}$ to $40_{SA25}$ to a satellite CPU 40'. The dots in FIG. 8 between the lines $40_{SA1}$ and $40_{SA25}$ indicate that like power and data lines also connect corresponding power and data lines to each antenna module microprocessor μproc (SA2) to μproc (SA24). The references used for the power and data lines and the satellite CPU here echo those shown in FIG. 4 to indicate that components identified by similar references function to perform route creation and data transmissions similar to those of their like-referenced counterparts in FIG. 4, as discussed now.

B. Route Creation and Data Transmission

In general, radio routes are created as discussed above in section IIIA. However, the use of multiple feeds for each satellite antenna necessitates identifying not only a particular satellite antenna for a given radio route, but also the individual feed of that antenna. For example, in one method of creating radio routes with a system according to the present embodiment, routing messages will include information on the antenna feed of the particular antenna, rather than just the antenna itself. This description will use as an example the creation of a radio route between two ground stations via a single satellite, discussed above in section III and depicted in FIG. 5. The ground station nodes can either have multi-feed antennas similar to the satellite nodes, or be constructed the same as in the embodiment associated with FIG. 5 with only a single feed per antenna. In either case, the ground station nodes can use larger and/or more antennas than the satellite nodes because the ground stations do not have the same size and weight constraints. However, a ground station node only requires antennas arranged for transmitting and receiving signals around a 180° sphere (that is, its antennas need only point "up" and "out" to provide coverage of the sky above the ground station).

Referring to the discussion accompanying Table 1, ground nodes send out routing signals with the initial information identified in Table 1. One or more satellites receive these signals on their antennas, but in the present embodiment the antenna module microprocessors μproc (SA) for each antenna module that receives a signal identifies both the particular antenna(s) that received signals from ground stations and the antenna feed on which the signals were received. The next steps in the routing process are analogous to the steps discussed in connection with Tables 2 and 3 above, in which all of the antennas of all of the satellites that have received initial information signals from a ground station broadcast a routing signal. However, in the present embodiment all of the feeds in all of the antennas broadcast the routing signal.

As seen in FIG. 7, the satellite antenna feeds are numbered to indicate that similar numbered feeds transmit routing signals in similar time slots. Likewise, similarly numbered feeds are disposed in the same location relative to the antenna reflector in all of the antennas in order to maximize the angular separation between like numbered feeds of adjacent antennas. Put another way, corresponding feeds of the satellite antennas are disposed in the substantially the same angular orientation relative to the antenna reflector in order to transmit at substantially the same angle relative to an axis of the antenna. Thus, the narrow radio beams from similarly numbered feeds can be broadcast simultaneously with virtually no chance that they will interfere with each other or be received at the same node. As a result, all of the antenna feeds in a node can transmit in the same time slot. For example, all of the antennas SA1 to SA25 would transmit from their F1 feeds at the same time, then all of the antennas would transmit from their F2 feeds at the same time, and so forth. This results in seven different time slots for each route creation cycle. In addition, all of the feeds are disposed on an imaginary surface with substantially the same topology as the antenna's reflecting surface. (For example, if the antenna has a parabolic reflector, the imaginary surface is also a parabola.) Accordingly, the present embodiment only needs seven time slots to broadcast routing signals from all of the antenna feeds, as opposed to 25 time slots as in the above embodiment using 25 single-feed antennas. This further increases the probability of rapidly creating a radio route between two ground stations.

Because of the increased spatial density of the antenna feeds, at least some of the incoming routing signals may be received by more than one feed. The individual antenna microprocessors μproc identify the feed that will provide the highest quality radio link if that antenna module were used in a radio route. This can be done using any of the criteria already discussed above. This information is passed on to the satellite CPU 40', via the power and data lines $40_{SA1}$ to $40_{SA25}$, which then performs its own evaluation of all of the radio signals selected by the individual antenna microprocessors. The same procedure is followed when an incoming radio signal from another node (in this example, ground station no. 1000) is received by feeds in bordering antenna modules. For example, an incoming initial information signal might be received by four feeds in adjoining antenna modules, such as $F3_{SA2}$, $F4_{SA2}$, $F1_{SA7}$, and $F6_{SA7}$. In that case, the microprocessor μproc (SA2) would determine which of its feeds F3 or F4 would provide the better radio link, and provide the determinative parameters supporting that decision to the satellite CPU 40'. Likewise, the microprocessor μproc (SA7) would determine which of its feeds F1 or F6 would provide the better radio link, and provide the determinative parameters supporting that decision to the satellite CPU 40'. The satellite CPU then uses all of the data received from the antenna modules to identify the antenna module and its feed to include in the routing signals sent from all of 175 antenna feeds. Radio routes are then identified between ground stations in accordance with the discussion accompanying FIG. 5.

Data transmissions proceed as described above in section IIIB. Without repeating the entire data transmission process from that section, the basic concept is that a data communication comprising packets of data with a header and a payload is received at an originating ground station. The header will typically include address information, including identification of the destination ground station. The data transmission module unpacks the address information and indicates the system address (node number) of the destination node. The packets will then be sent to the destination ground station over the radio route established in the manner described above.

In a variation of the process, the routing messages sent between the nodes do not include antenna feed information. That is, they are essentially the same as in the route creation process described in association with Tables 2 and 3 above. In this adaptation, the satellites store the antenna feed associated with a particular receiving antenna. For example, in Table 2, if the satellite node no. 250 received the routing signal on feed F7 of receiving antenna SA6, the satellite would store that information on board. Then, if the route for a data transmission to ground node 1000 included the antenna SA6 in satellite no. 250, the satellite would broadcast it using feed F7 of that antenna.

The following is a summary of steps involved in creating an inter-nodal radio route for data transmissions pursuant to one exemplary application of the present embodiment:
1. A first node N1 transmits a first routing message from a plurality of its antennas.
2. The first routing message from node N1 may be received by at least two different nodes N2 and N3.
3. Node N2 may bear the first routing message on more than one feed of a first antenna and/or on more than one feed of a second antenna.
4. If so, node N2 determines the feed with the highest quality signal in the first antenna and the feed with the highest quality signal in the second antenna.
5. Node N2 then compares the signal quality as between the first and second antennas, and selects the antenna with the better quality signal.
6. Then node N2 transmits a second routing message including its identity ("N2"), the identity of node N1, and the signal quality between node N1 and node N2.
7. Node N3 may also receive the first routing message on more than one feed of a first antenna and/or on more than one feed of a second antenna; if so, node N3 then compares the signal quality between the first and second antennas, and selects the antenna with the better quality signal.

8. Then node N3 transmits a third routing message including its identity ("N3"), the identity of node N1, and the signal quality between node N1 and node N3.
9. A node N4 that receives the first and second routing messages thus knows the higher quality radio route (via either node N2 or N3) to node N1.
10. Calls (data transmissions) received by the node N4 for transmission to node N1 are directed accordingly to the node N2 or the node N3, which in turn transmits the call to node N1 using the antenna feed identified in step 5 (node N2) or in the antenna feed identified step 7 (node N3).

It will be appreciated that in this example, the node N1 can represent a destination ground station or an intermediate node that links with another satellite node. Likewise, the node N4 can represent an originating ground station or an intermediate node that links with another satellite. It should also be understood that the above steps are presented as one way of creating a radio route between nodes in a system according this embodiment. It will not be applicable in all instances. For example, a given satellite antenna feed may receive a routing message of insufficient quality to pass a threshold test and thus be rejected by the processing circuitry in the satellite as suitable for use in a radio route.

C. Summary

By using larger satellite antennas the present embodiment increases the gain of routing signals transmitted from the satellites by a multiple proportional to the square of the increase antenna diameter, but only decreases the antenna HPBW by an amount proportional to the diameter itself. At the same time, each of the antennas has multiple feeds, which in effect multiplies the number of satellite antennas available for route creation by the number of feeds in each antenna. In the exemplary satellite depicted in FIG. 7 the effective number of antennas is 125. It will be appreciated that providing satellites with route creation capabilities approaching those achieved by this embodiment would require the same number of single-feed antennas with the same size. Since corresponding disposed feeds of different antennas can broadcast routing messages in the same time slot, only seven time slots are needed for each route-creation cycle, rather than 25 as in the embodiment with 25 single-feed antennas. This will decrease the time it takes to establish routes.

A satellite with 125 single-feed antennas capable of broadcasting and receiving radio signals at comparable gains and beam widths would require 100 additional single-feed antennas. Such a system would be within the scope of the present invention in its broadest aspects, but it would obviate many important objects of the invention. One of those objects is to provide a system in which the satellites are so small and lightweight that the cost of launching is minimal. One way launch costs can be minimized is to launch multiple satellites on a single vehicle. Larger and heavier satellites require more launches than smaller, lighter ones. While the present embodiment using multi-feed antennas will typically use satellites that will be larger and slightly heavier than the single-feed embodiment discussed further above, they will still be orders of magnitude smaller and lighter than a satellite having enough single-feed antennas to achieve the same functionality. In addition, increasing by several-fold the number of routing signals sent from each satellite will likely increase the probability of creating radio links with ground stations and other satellites, which could reduce the number of satellites required to achieve the same results as using satellites with single-feed antennas, thus bringing down the cost of deployment of a system in accordance with the present embodiment.

In addition, ground nodes with multi-feed antennas will also enhance communications directly between them. For example, depending on the terrain served by a system according to the present embodiment, suitable algorithms in the system nodes (satellites and ground stations) may assemble a radio route between two particular ground stations without involving any of the satellites. Moreover, such nodes could be used to enhance the operability of purely ground-based radio mesh systems such as those disclosed in the inventor's U.S. Pat. Nos. 5,793,842 and 6,459,899. Nodes capable of producing high gain beams over a certain spherical extent would find utility in cities with tall buildings, which could include nodes capable of directing radio beams toward the ground. Another example would be cities that include high hills and valleys, such as the Los Angeles area.

In ground node-to-node communication systems, city-wide bandwidth can be conserved by the use of very narrow beams created by multi-feed antennas such as those characterizing the present embodiment. These higher gain antennas would also provide better received signal strength. Although a multi-feed antenna system will require additional radio transceivers, making cost a consideration, it is possible that a hemispherical design could be used facing round side up in valleys and round facing side down in higher elevations to reduce the number of antennas required in a given node.

VI. Other Aerial Node Embodiments for Three-Dimensional Radio Mesh Systems

As already pointed out, implementation of the three-dimensional radio system described herein is not limited to using satellites in low-earth orbits of approximately 500 miles or so. In one variation, satellites in very low earth orbits, in the range of 100-200 miles, can be utilized to increase the strength of radio signals reaching the ground. In addition, non-orbiting aerial nodes can also be used in the systems described herein. For example, nodes similar in construction to the satellites described above can be suspended from balloons that are allowed to drift freely in the stratosphere (or at lower altitudes). The balloon-mounted nodes would include antennas corresponding to the satellite antennas described above arranged in the nodes for transmitting and receiving signals in plural directions. Another variation could mount such nodes on unmanned aerial vehicles ("drones") deployed randomly over a particular area. It is believed that such a system would enable communications directly from hand-held devices or other personal devices more readily than a satellite-based system because the drones would be closer to the ground stations (hand-held devices) than in a satellite node system.

Figure 9:
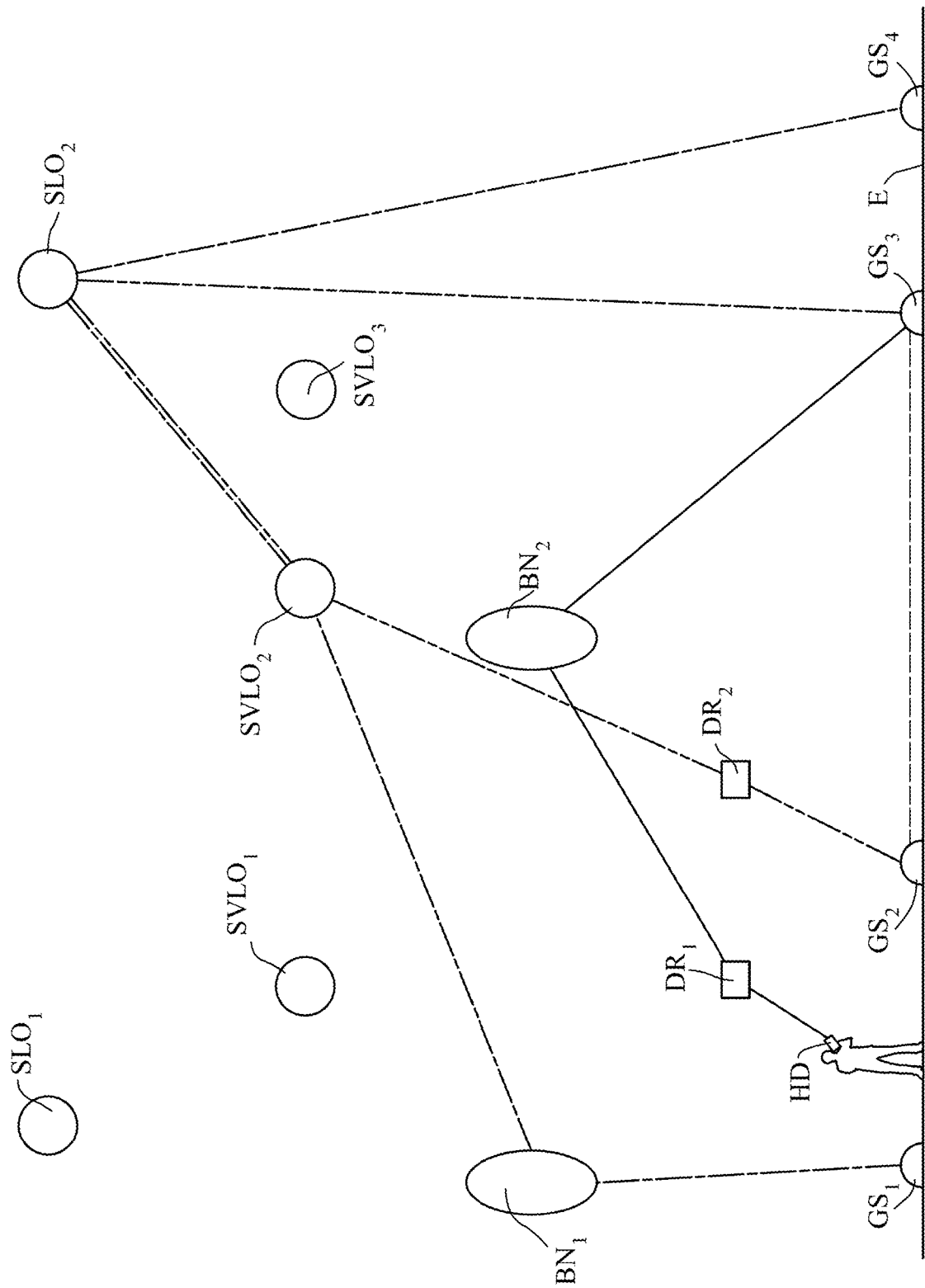
FIG. 9 is a notional depiction of systems using various types of non-low-earth-orbit aerial vehicles, as well as showing a direct link between ground stations incorporating the antenna configuration and control circuitry depicted in FIGS. 7 and 8.

Any one of the above variations on the low-earth orbit satellites can be used independently, or in combinations of two or more such variations. FIG. 9 illustrates some of these variations. In the figure, low earth orbit satellites $SLO_1$ and $SLO_2$ represent a large plurality of such satellites, which have no attitude control such as the satellites discussed in detail above. Also represented in FIG. 9 are very low earth orbit satellites $SVLO_1$, $SVLO_2$, $SVLO_3$, etc., which represent a large plurality of such satellites without attitude control. These satellites could be used to support the so-called "Internet of Things" (IoT), which is generally taken to mean inter-networked physical devices, vehicles (also referred to as "connected devices" and "smart devices"), buildings, and other items embedded with electronics, software, sensors, actuators, and network connectivity which enable these objects to collect and exchange data. Such IoT devices must connect directly to each other, and the stronger signal strength from the low-flying satellites can increase the signal strength available at the earth's surface by up to 6 dB more than the satellites at higher altitudes. Further improvement in the operability of such a system can be achieved by using satellites with multi-feed antennas as described in the previous embodiment.

Another alternative node type would be mounted on balloons $BN_1$, $BN_s$, etc., permitted to float in the atmosphere high altitudes. The balloons may prove useful in providing communication services (Internet access, emails, etc.) to relatively small areas on the surface of the earth E. Google is testing a system it calls Project Loon to provide Internet access to rural and remote areas. According to reports, high-altitude balloons are placed in the stratosphere at an altitude of about 18 km (11 miles) to create an aerial wireless network. The balloons are maneuvered by adjusting their altitude in the stratosphere to float to a wind layer after identifying the wind layer with the desired speed and direction using published wind data. Signals travel through the balloon network from balloon to balloon, then to a ground-based station connected to an Internet service provider (ISP), then onto the global Internet. See, for example, "Project Loon," Wikipedia, https://en.wikipedia.org/wiki/Project_Loon (last visited Sep. 20, 2017). One skilled in the art could easily adapt nodes such as those described herein, including those with multi-feed antennas, as in the Google Project Loon system.

Another type of non-orbital aerial node could be mounted on drones $DR_1$, $DR_2$, etc. The drones could fly over prescribed areas at altitudes of 1000-2000 feet, although other altitudes might be desirable depending on the particular area to be serviced by the system. These nodes would preferably use the multi-feed antenna embodiment described above to provide a strong enough signal to enable direct communication with individual hand-held devices HD, as indicated by the route in solid lines between the ground station $GS_3$ and the hand-held device HD via the balloon $BN_2$ and the drone $DR_1$. There might also be a route from the ground station $GS_2$ to the hand-held device via the drone $DR_1$. FIG. 9 also shows in single-dot-dash lines and double-dot-dash lines other exemplary routes created using aerial nodes in accordance with the description herein. A route directly between two ground stations, in accordance with the discussion further above, is depicted by a dashed line in the figure.

VII. Other Modifications and Variations

It will be appreciated that numerous variations and modifications of the structures and methods described heretofore are possible within the scope of the present invention. The above exemplary embodiments use addition of the figures of merit of two potential radio links to select a preferred radio route. However, the invention encompasses other ways of determining a preferred route, since using the sums of the figures of merit for two different potential radio routes would favor a multiple satellite route over a single satellite route. Thus, although addition of the figures of merit in a single satellite route will typically result in an optimum or preferred route, more complex and sophisticated algorithms may be necessary to implement this aspect of the invention when choosing between potential single- and multiple-satellite routes or between two potential multiple-satellite routes. One possible approach in those situations would be to select a particular route when other potential routes would include a link judged to be inferior for one or more reasons, some examples of which are discussed above (inadequate signal strength and/or excessive error rate between various nodes in a potential multiple satellite route, low remaining satellite battery life, excessive link loading, or eliminating potential links with figures of merit below a predetermined threshold).

Those skilled in the art will recognize that "figure of merit" as discussed herein is simply one way of articulating the important concept of choosing a radio route deemed to be optimum for data communications between two ground stations. The parameters used in determining a figure of merit for a particular potential link are not limited to those specifically pointed out in this description. One example would take into account that the satellites are moving relative to each other, so that the quality of potential links between satellites or between a satellite and a ground station will change over time. Thus, one of the factors in selecting a link could be the derivative of link quality (figure of merit) with respect to time, since a positive value would indicate that the link quality would increase and thus be more stable, while a negative value would indicate the opposite.

VII. Summary and Conclusion

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A radio communications system comprising multiple satellites orbiting the earth for providing a radio route for data communications between transceivers at two ground station locations, each satellite and ground station comprising a node of the system, wherein each of a plurality of the satellites includes:

a plurality of satellite antennas for receiving an initial information signal from at least one ground station and for transmitting further information signals from multiple satellite antennas, each antenna being constructed for transmitting radio signals in a plurality of directions different from each other and for receiving radio signals in a plurality of directions different from each other;

antenna pairing circuitry for storing (i) address information identifying a ground station from which the satellite received an initial information signal, (ii) the identity of the satellite antenna on which the satellite received the initial information signal, and (iii) the direction from which the antenna received the initial information signal; and route creation circuitry for transmitting further information signals from a plurality of the satellite antennas, wherein the further information signals comprise (i) linking information including the address information identifying the ground station that sent the initial information signal, and (ii) a characteristic of the received initial information signal indicating a suitability of the satellite as a node in a radio route to the ground station identified by the stored address information.

2. A system as in claim 1, wherein the linking information identifies the satellite sending the further information signal.

3. A system as in claim 1, wherein the satellites orbit the earth in random orbits without attitude control.

4. A system as in claim 1, wherein the satellites orbit the earth in uncontrolled orbits.

5. A method for creating a radio communication route for data communications from a receiving ground station to a sending ground station via a system as in claim 1, wherein the ground stations include at least one ground station directional antenna for transmitting and receiving radio signals in a plurality of different directions and the characteristic is a quality of the initial information signal, the method comprising:
- (a) receiving at a satellite antenna of at least one satellite an initial information signal transmitted from an antenna at a sending ground station;
- (b) storing at any satellite receiving the initial information signal at least (i) address information identifying the ground station from which the satellite received an initial information signal, (ii) the identity of the satellite antenna on which the satellite received the initial information signal, and (iii) the direction from which the antenna received the initial information signal;
- (c) transmitting the further information signals from a plurality of the antennas of at least one satellite receiving the initial information signal, wherein the further information signals include routing messages that comprise (i) linking information including the address information identifying the ground station that sent the initial information signal, and (ii) the quality of the received initial information signal indicating a suitability of the satellite as a node in the radio route to the ground station identified by the stored address information;
- (d) storing at a receiving ground station receiving at least one routing message (i) the identity of a receiving ground station antenna on which the routing message was received, and (ii) the quality of the initial information signal received at the satellite transmitting the routing message; and
- (e) determining a quality of a radio route for data communications from the receiving ground station to the sending ground station via a particular satellite based on (i) a quality of the routing message received at the receiving ground station indicating a suitability of the particular satellite as a node in a radio route between the ground stations, and (ii) the quality of the initial information signal.

6. A method as in claim 5 further including sending a data transmission from the receiving ground station to the sending ground station.

7. A method as in claim 5, wherein the determining step is performed by the receiving ground station without a controlling computer communicating with the satellites or other ground stations.

8. A system as in claim 1, wherein the satellites rotate about an axis of rotation.

9. A method for creating a radio communication route including multiple satellites via a system as in claim 1, wherein the route comprises plural satellites, the characteristic is a quality of the initial information signal and the further information signals are routing messages, the method comprising:
- (a) transmitting a first routing message from a plurality of the antennas of a first satellite N1 receiving the initial information signal;
- (b) identifying at a second satellite N2 one or more message directions from which each of a first antenna and a second antenna receives the first routing message;
- (c) designating at the second satellite N2 the message direction of the first antenna with the highest quality signal and the message direction of the second antenna with the highest quality signal;
- (d) selecting from the designated message direction the antenna and direction of satellite N2 with the higher signal quality;
- (e) storing at the satellite N2 the antenna and direction selected in step (d); and
- (f) transmitting from the satellite N2 a second routing message indicating the higher signal quality selected in step (d) and the signal quality of the initial information signal.

10. A ground station for use with a radio communications system comprising multiple satellites orbiting the earth for providing a radio route for data communications between transceivers at two ground stations, wherein each of a plurality of the satellites includes (a) a plurality of satellite antennas for receiving an initial information signal from at least one ground station and for transmitting further information signals, (b) antenna pairing circuitry for storing address information identifying a ground station from which the satellite received an initial information signal and the identity of the satellite antenna on which the satellite received the initial information signal, and (c) route creation circuitry for transmitting further information signals from a plurality of the satellite antennas, wherein the further information signals comprise (i) linking information including the address information identifying the ground station that sent the initial information signal, and (ii) a characteristic of the received initial information signal indicating a suitability of the satellite as a node in a radio route to the ground station identified by the stored address information, the ground station including:
- at least one directional antenna for transmitting initial information signals with the address information in a plurality of different directions and for receiving from at least one of said satellites linking information including address information identifying a different ground station that transmitted an initial information signal.

11. A ground station as in claim 10 for use with a radio communications system in which the satellites orbit the earth in random orbits without attitude control.

12. A ground station as in claim 10 for use with a radio communications system in which the satellites orbit the earth in uncontrolled orbits.

13. A radio communications system comprising multiple satellites orbiting the earth for providing a radio route for data communications between transceivers at two ground station locations, each satellite and ground station comprising a node of the system, wherein each of a plurality of the satellites includes:
- a plurality of satellite antennas for receiving an initial information signal from at least one ground station and for transmitting further information signals from multiple satellite antennas, wherein each of the satellite antennas comprises a reflector with a plurality of antenna feeds for transmitting radio signals in a plurality of directions different from each other and for receiving radio signals in the respective different directions;
- antenna pairing circuitry for storing (i) address information identifying a ground station from which the satellite received an initial information signal, (ii) the identity of the satellite antenna on which the satellite received the initial information signal, and (iii) the identity of an antenna feed on which the satellite received the initial information signal; and
- route creation circuitry for transmitting further information signals from a plurality of the satellite antennas, wherein the further information signals comprise (i)

linking information including the address information identifying the ground station that sent the initial information signal, and (ii) a characteristic of the received initial information signal indicating a suitability of the satellite as a node in a radio route to the ground station identified by the stored address information.

14. A system as in claim 13, wherein the linking information identifies the satellite sending the further information signal.

15. A system as in claim 13, wherein the satellites orbit the earth in random orbits without attitude control.

16. A system as in claim 13, wherein the satellites orbit the earth in uncontrolled orbits.

17. A system as in claim 13, wherein the satellites rotate about an axis of rotation.

18. A method for creating a radio communication route for data communications from a receiving ground station to a sending ground station via a system as in claim 13, wherein the ground stations include at least one ground station antenna with a plurality of antenna feeds for transmitting and receiving radio signals in a plurality of different directions and the characteristic is a quality of the initial information signal, the method comprising:
   (a) receiving at a satellite antenna of at least one satellite an initial information signal transmitted from an antenna at a sending ground station;
   (b) storing at any satellite receiving the initial information signal at least (i) address information identifying the ground station from which the satellite received an initial information signal, (ii) the identity of the satellite antenna on which the satellite received the initial information signal, and (iii) the identity of the antenna feed on which the satellite received the initial information signal;
   (c) transmitting the further information signals from a plurality of antenna feeds of at least one satellite receiving the initial information signal, wherein the further information signals include routing messages that comprise (i) linking information including the address information identifying the ground station that sent the initial information signal, and (ii) the quality of the received initial information signal indicating a suitability of the satellite as a node in the radio route to the ground station identified by the stored address information;
   (d) storing at a receiving ground station receiving at least one routing message (i) the identity of a receiving ground station antenna feed on which the routing message was received, and (ii) the quality of the initial information signal received at the satellite transmitting the routing message; and
   (e) determining a quality of a radio route for data communications from the receiving ground station to the sending ground station via a particular satellite based on (i) a quality of the routing message received at the receiving ground station indicating a suitability of the particular satellite as a node in a radio route between the ground stations, and (ii) the quality of the initial information signal.

19. A method as in claim 18 further including sending a data transmission from the receiving ground station to the sending ground station.

20. A method as in claim 18, wherein the determining step is performed by the receiving ground station without a controlling computer communicating with the satellites or other ground stations.

21. A method for creating a radio communication route including multiple satellites via a system as in claim 13, wherein the route comprises plural satellites, the characteristic is a quality of the initial information signal and the further information signals are routing messages, the method comprising:
   (a) transmitting a first routing message from a plurality of the antenna feeds of a first satellite N1 receiving the initial information signal;
   (b) identifying at a second satellite N2 one or more antenna feeds from which each of a first antenna and a second antenna receives the first routing message;
   (c) designating at the second satellite N2 the antenna feed of the first antenna with the highest quality signal and the antenna feed of the second antenna with the highest quality signal;
   (d) selecting from the designated antenna feeds the antenna feed of satellite N2 with the higher signal quality;
   (e) storing at the satellite N2 the antenna feed selected in step (d); and
   (f) transmitting from the satellite N2 a second routing message indicating the higher signal quality selected in step (d) and the signal quality of the initial information signal.

22. A ground station for use with a radio communications system comprising multiple satellites orbiting the earth for providing a radio route for data communications between transceivers at two ground stations, wherein each of a plurality of the satellites includes (a) a plurality of satellite antennas for receiving an initial information signal from at least one ground station and for transmitting further information signals, each of the satellite antennas comprising a reflector with a plurality of antenna feeds for transmitting radio signals in a plurality of directions different from each other and receiving radio signals in the respective different directions; (b) antenna pairing circuitry for storing (i) address information identifying a ground station from which the satellite received an initial information signal; (ii) the identity of the satellite antenna on which the satellite received the initial information signal; and (iii) the identity of an antenna feed on which the satellite received the initial information signal, and (c) route creation circuitry for transmitting further information signals from a plurality of the satellite antennas, wherein the further information signals comprise (i) linking information including the address information identifying the ground station that sent the initial information signal, and (ii) a characteristic of the received initial information signal indicating a suitability of the satellite as a node in a radio route to the ground station identified by the stored address information, the ground station including:
   at least one directional antenna for transmitting initial information signals with the address information in a plurality of different directions and for receiving from at least one of said satellites linking information including address information identifying a different ground station that transmitted an initial information signal.

23. A ground station as in claim 22 for use with a radio communications system in which the satellites orbit the earth in random orbits without attitude control.

24. A ground station as in claim 22 for use with a radio communications system in which the satellites orbit the earth in uncontrolled orbits.

* * * * *